US007450669B2

(12) United States Patent
Mori

(10) Patent No.: US 7,450,669 B2
(45) Date of Patent: Nov. 11, 2008

(54) DEMODULATION APPARATUS AND METHOD, AND INTEGRATED CIRCUIT OF DEMODULATION APPARATUS

(75) Inventor: Ryosuke Mori, Mino (JP)

(73) Assignee: Panasonic Corporation, Osaka (JP)

( * ) Notice: Subject to any disclaimer, the term of this patent is extended or adjusted under 35 U.S.C. 154(b) by 646 days.

(21) Appl. No.: 11/006,040

(22) Filed: Dec. 7, 2004

(65) Prior Publication Data
US 2005/0147187 A1 Jul. 7, 2005

(30) Foreign Application Priority Data
Dec. 8, 2003 (JP) ............... 2003-408598

(51) Int. Cl.
*H04L 27/06* (2006.01)
(52) U.S. Cl. ............... 375/343; 375/136; 375/147; 375/150; 375/271; 375/343
(58) Field of Classification Search ............... 375/136, 375/140, 143, 142, 147, 150, 152, 271–272, 375/287, 303, 322–323, 343, 346; 370/208, 370/210
See application file for complete search history.

(56) References Cited

U.S. PATENT DOCUMENTS

| 5,602,835 | A | 2/1997 | Seki et al. | |
|---|---|---|---|---|
| 6,330,293 | B1 | 12/2001 | Klank et al. | |
| 6,421,401 | B1 * | 7/2002 | Palin | 375/343 |
| 6,438,183 | B1 * | 8/2002 | Taura et al. | 375/343 |
| 2002/0105903 | A1 * | 8/2002 | Takahashi et al. | 370/208 |
| 2002/0126780 | A1 * | 9/2002 | Oshima et al. | 375/347 |
| 2003/0117943 | A1 * | 6/2003 | Sakata et al. | 370/210 |
| 2003/0219084 | A1 | 11/2003 | Parker | |
| 2004/0071221 | A1 * | 4/2004 | Nakada et al. | 375/260 |
| 2004/0125858 | A1 * | 7/2004 | Ohtaki et al. | 375/136 |
| 2006/0165197 | A1 * | 7/2006 | Morita et al. | 375/326 |
| 2006/0269008 | A1 * | 11/2006 | Bohnke et al. | 375/260 |

FOREIGN PATENT DOCUMENTS

| JP | 11-127131 | 5/1999 |
|---|---|---|
| JP | 11-196062 | 7/1999 |
| JP | 2001-136146 | 5/2001 |
| JP | 2002-204405 | 7/2002 |
| JP | 2003-46472 | 2/2003 |
| JP | 2003-264528 | 9/2003 |

* cited by examiner

*Primary Examiner*—Shuwang Liu
*Assistant Examiner*—Hirdepal Singh

(57) ABSTRACT

An OFDM modulation apparatus receives a signal composed of OFDM symbols each of which is composed of an effective symbol and a guard interval, generates K delayed signals by delaying the received signal by K effective symbol periods, generates a signal by adding up all the K delayed signals, generates a first correlation signal that shows a correlation between the received signal and the addition-result signal, generates K×L second correlation signals from the first correlation signal, based on K×L combinations of K effective symbol periods and L fractions used to indicate the guard interval period, detects one among the K×L second correlation signals that indicates a largest correlation level, and detect periods of the effective symbol and the guard interval of the received signal in accordance with the detected second correlation signal.

15 Claims, 21 Drawing Sheets

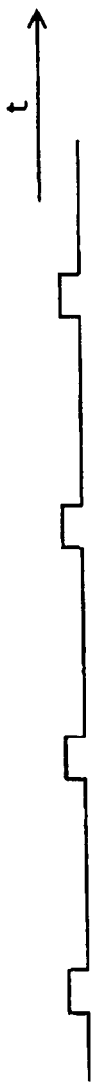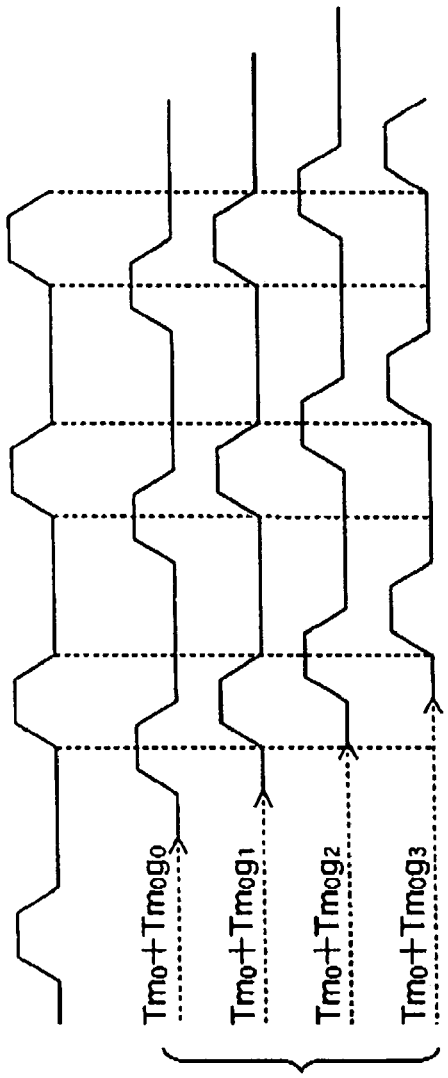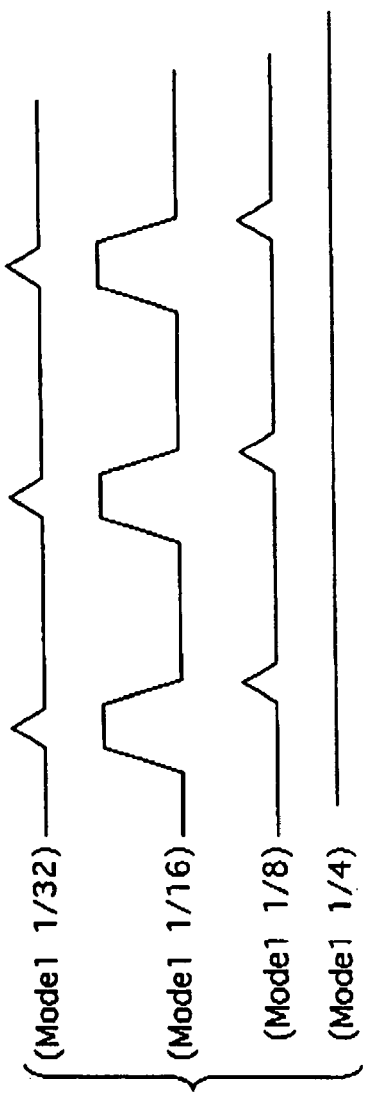
FIG.7A OUTPUT FROM FIRST CORRELATION CALCULATION SUB-UNIT
FIG.7B OUTPUT FROM INTEGRATION SUB-UNIT
FIG.7C OUTPUT FROM SECOND DELAY PROCESSING SUB-UNIT
FIG.7D OUTPUT FROM SECOND CORRELATION CALCULATION SUB-UNIT

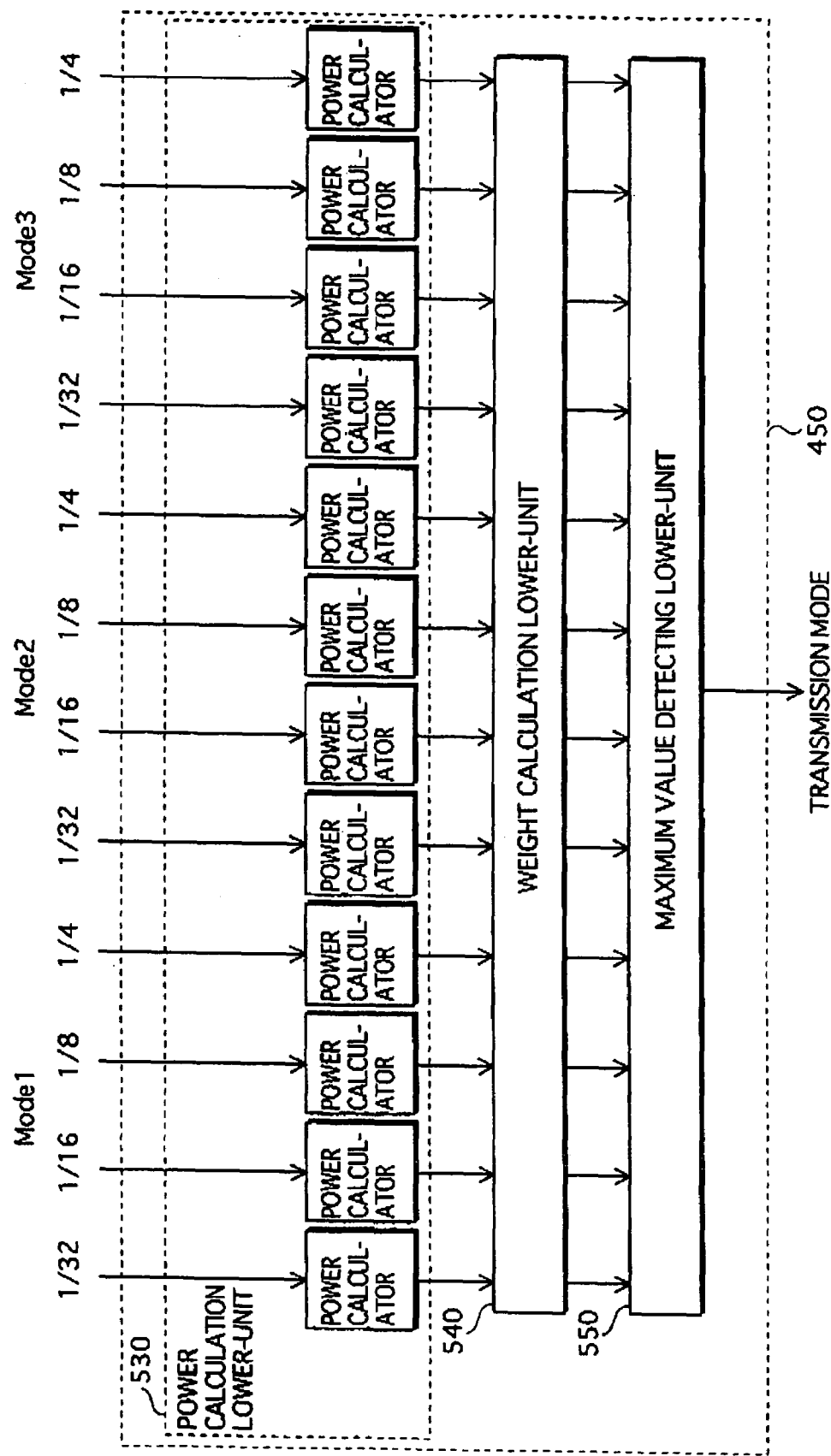

POWER CALCULATED FOR INPUT SIGNAL TRANSMITTED
IN MODE 1 WITH GUARD INTERVAL LENGTH 1/32

POWER CALCULATED FOR INPUT SIGNAL TRANSMITTED
IN MODE 1 WITH GUARD INTERVAL LENGTH 1/16

POWER CALCULATED FOR INPUT SIGNAL TRANSMITTED
IN MODE 1 WITH GUARD INTERVAL LENGTH 1/8

POWER CALCULATED FOR INPUT SIGNAL TRANSMITTED
IN MODE 1 WITH GUARD INTERVAL LENGTH 1/4

POWER CALCULATED FOR INPUT SIGNAL TRANSMITTED
IN MODE 2 WITH GUARD INTERVAL LENGTH 1/32

POWER CALCULATED FOR INPUT SIGNAL TRANSMITTED
IN MODE 2 WITH GUARD INTERVAL LENGTH 1/16

POWER CALCULATED FOR INPUT SIGNAL TRANSMITTED
IN MODE 2 WITH GUARD INTERVAL LENGTH 1/8

POWER CALCULATED FOR INPUT SIGNAL TRANSMITTED
IN MODE 2 WITH GUARD INTERVAL LENGTH 1/4

POWER CALCULATED FOR INPUT SIGNAL TRANSMITTED
IN MODE 3 WITH GUARD INTERVAL LENGTH 1/32

POWER CALCULATED FOR INPUT SIGNAL TRANSMITTED
IN MODE 3 WITH GUARD INTERVAL LENGTH 1/16

POWER CALCULATED FOR INPUT SIGNAL TRANSMITTED
IN MODE 3 WITH GUARD INTERVAL LENGTH 1/8

POWER CALCULATED FOR INPUT SIGNAL TRANSMITTED
IN MODE 3 WITH GUARD INTERVAL LENGTH 1/4

WEIGHTED OUTPUT FOR SIGNAL TRANSMITTED IN MODE 1
WITH GUARD INTERVAL LENGTH 1/32

WEIGHTED OUTPUT FOR SIGNAL TRANSMITTED IN MODE 1
WITH GUARD INTERVAL LENGTH 1/16

WEIGHTED OUTPUT FOR SIGNAL TRANSMITTED IN MODE 1
WITH GUARD INTERVAL LENGTH 1/8

WEIGHTED OUTPUT FOR SIGNAL TRANSMITTED IN MODE 1
WITH GUARD INTERVAL LENGTH 1/4

WEIGHTED OUTPUT FOR SIGNAL TRANSMITTED IN MODE 2
WITH GUARD INTERVAL LENGTH 1/32

WEIGHTED OUTPUT FOR SIGNAL TRANSMITTED IN MODE 2
WITH GUARD INTERVAL LENGTH 1/16

WEIGHTED OUTPUT FOR SIGNAL TRANSMITTED IN MODE 2
WITH GUARD INTERVAL LENGTH 1/8

WEIGHTED OUTPUT FOR SIGNAL TRANSMITTED IN MODE 2
WITH GUARD INTERVAL LENGTH 1/4

WEIGHTED OUTPUT FOR SIGNAL TRANSMITTED IN MODE 3
WITH GUARD INTERVAL LENGTH 1/32

WEIGHTED OUTPUT FOR SIGNAL TRANSMITTED IN MODE 3
WITH GUARD INTERVAL LENGTH 1/16

WEIGHTED OUTPUT FOR SIGNAL TRANSMITTED IN MODE 3
WITH GUARD INTERVAL LENGTH 1/8

WEIGHTED OUTPUT FOR SIGNAL TRANSMITTED IN MODE 3
WITH GUARD INTERVAL LENGTH 1/4

FIG.21

| TRANSMISSION MODE | | Mode1 | Mode2 | Mode3 |
|---|---|---|---|---|
| EFFECTIVE SYMBOL LENGTH | | $Tm_0=2048$ | $Tm_1=4096$ | $Tm_2=8192$ |
| GUARD INTERVAL LENGTH | 1/32 | $Tm_0g_0=64$ | $Tm_1g_0=128$ | $Tm_2g_0=256$ |
| | 1/16 | $Tm_0g_1=128$ | $Tm_1g_1=256$ | $Tm_2g_1=512$ |
| | 1/8 | $Tm_0g_2=256$ | $Tm_1g_2=512$ | $Tm_2g_2=1024$ |
| | 1/4 | $Tm_0g_3=512$ | $Tm_1g_3=1024$ | $Tm_2g_3=2048$ |

DEMODULATION APPARATUS AND METHOD, AND INTEGRATED CIRCUIT OF DEMODULATION APPARATUS

BACKGROUND OF THE INVENTION (1) Field of the Invention

The present invention relates to a demodulation apparatus using the OFDM (Orthogonal Frequency Division Multiplexing) method that is adopted in the terrestrial digital broadcasting in Japan and the like, and specifically relates to a technology for automatically detecting a transmission mode.

(2) Description of the Related Art

At present, the OFDM method, which is one of digital modulation methods, is adopted as a transmission method in the terrestrial digital broadcasting in Japan (ISDB-T: Integrated Services Digital Broadcasting-Terrestrial transmission—see Non-Patent Document 1) and in Europe (DVD-T: Digital Video Broadcasting-Terrestrial transmission). The OPDM method is a transmission method suited for high-speed data communications since it is excellent in use of frequency.

Also, in the OFDM method, a redundant signal called guard interval signal is added to prevent communication failures such as a multipath that occur in the actual communication systems.

The transmission symbol of the OFDM signal is composed of an effective symbol and a guard interval. In the transmission method for the terrestrial digital broadcasting in Japan, the guard interval precedes the effective symbol, and has a copy of the latter part of the effective symbol.

With such data structure, if the delay time of the reflected wave is within the range of the guard interval, it is possible to demodulate the effective symbol completely by performing a certain process.

However, since the guard interval is a copy of part of the effective symbol that is the main body of the transmission signal, the transmission efficiency is reduced.

For this reason, for a signal transmission, an optimum transmission mode is selected among a plurality of available transmission modes, taking factors such as the amount of multipath delay for the expected transmission path and the transmission efficiency into consideration. Here, the available transmission modes correspond one-to-one to a plurality of transmission symbol periods, that is to say, combinations of an effective symbol period and a guard interval period.

An OFDM demodulation apparatus for receiving a signal that is transmitted in such a manner is required to recognize the transmission mode in which the signal is transmitted, to correctly demodulate the effective symbol of the received signal.

The OFDM demodulation apparatus can recognize the transmission mode if the transmission mode is determined in advance. However, considering the convenience, it is desirable that the demodulation apparatus can deal with a variety of transmission modes that vary by region or time.

Such a demodulation apparatus is required to have a function to detect the transmission mode of a received signal automatically at a high speed.

The following two are conventionally proposed technologies for automatically detecting the transmission mode.

One proposes a serial type detection method in which all the available transmission modes are checked one by one for the received signal. The other proposes a parallel type detection method for which a plurality of detection circuits corresponding to the available transmission modes are provided in parallel (see Patent Document 1).

The serial type detection method has an advantage that the circuit size is small, but has a defect that it requires a long time to detect the transmission mode. The parallel type detection method has a defect that the circuit size is large, but has an advantage that it requires a short time to detect the transmission mode.

[Patent Document 1]: Japanese Patent Publication No. 2863747

[Non-Patent Document 1]: Standard "Transmission Method for Terrestrial Digital Broadcasting" ARIB STD-B31

SUMMARY OF THE INVENTION

The object of the present invention is therefore to provide an OFDM demodulation apparatus that has a circuit size nearly as small as the circuit size of the serial type detection method, and has the short detection time of the parallel type detection method.

The above object is fulfilled by a demodulation apparatus for demodulating a signal composed of a plurality of OFDM symbols each of which is composed of an effective symbol and a guard interval whose period is a fraction of a period of the effective symbol, comprising: a signal receiving unit operable to receive the signal in which the effective symbol has one of K periods, and the period of the guard interval is one of L fractions of the effective symbol period, wherein K and L are each a given natural number; a first correlation unit operable to generate a first correlation signal from the received signal, based on the K effective symbol periods; a second correlation unit operable to generate K×L second correlation signals from the first correlation signal, based on K×L combinations of the K effective symbol periods and the L fractions; a detection unit operable to detect one among the K×L second correlation signals that indicates a largest correlation level, and detect periods of the effective symbol and the guard interval of the received signal in accordance with the detected second correlation signal; and a demodulation unit operable to demodulate the received signal in accordance with the periods of the effective symbol and the guard interval detected by the detection unit.

The above object is also fulfilled by a demodulation apparatus for demodulating a signal composed of a plurality of OFDM symbols each of which is composed of an effective symbol and a guard interval whose period is a fraction of a period of the effective symbol, comprising: a signal receiving unit operable to receive the signal in which the effective symbol has one of K periods, and the period of the guard interval is one of L fractions of the effective symbol period, wherein K and L are each a given natural number; a first correlation unit operable to generate a first correlation signal from the received signal, based on the K periods of the effective symbol; an integration signal generating unit operable to generate an integration signal by integrating each period included in a predetermined period of the first correlation signal, each period being equal to the shortest period among K×L periods of the guard interval; a measuring unit operable to measure a duration between a time when the integration signal exceeds a predetermined threshold value a first time and a time when the integration signal exceeds the predetermined threshold value a second time; a detection unit operable to detect periods of the effective symbol and the guard interval of the received signal in accordance with the measured duration; and a demodulation unit operable to demodulate the received signal in accordance with the periods of the effective symbol and the guard interval detected by the detection unit.

In the above-described demodulation apparatus, the first correlation unit may generate K different delayed signals by delaying the received signal respectively by the K periods of the effective symbol, generate an added-up signal by adding up all the K generated delayed signals, and generate the first correlation signal that shows a correlation between the received signal and the added-up signal.

In the above-described demodulation apparatus, the first correlation unit may generate K different delayed signals by delaying the received signal respectively by the K periods of the effective symbol, generate K correlation signals that respectively show correlations between the received signal and the K delayed signals, and generate the first correlation signal by adding up the K correlation signals.

With the above-stated construction for generating one signal by adding up all the delayed signals, the demodulation apparatus is required to have only one circuit for generating the correlation signal.

This enables the circuit size of the demodulation apparatus to be reduced.

In the above-described demodulation apparatus, the second correlation unit may generate an integration signal by accumulating the first correlation signal in a predetermined period, each period being equal to the shortest period among K×L periods of the guard interval, generates K×L delayed signals by delaying the integration signal respectively by K×L periods of OFDM symbol that are made by combining the K periods of the effective symbol and the L fractions, and generates the K×L second correlation signals by calculating correlations between the received signal and the K×L delayed signals, respectively.

With the above-stated construction for performing an integration on the first correlation signal, the demodulation apparatus is required to have only one circuit for performing the integration.

That is to say, the demodulation apparatus of the present invention is not required to have a plurality of delay/correlation calculation units and as many integration units as there are available transmission modes, which are required in the conventional technologies. This enables the circuit size of the demodulation apparatus to be reduced greatly.

In the above-described demodulation apparatus, the detection unit may include: a power calculation sub-unit operable to calculate values of power of the K×L second correlation signals; and a weight assigning sub-unit operable to assign weights to the calculated values of power of the K×L second correlation signals, wherein the detection unit regards a second correlation signal having a largest value of power after the assignment of weights by the weight assigning sub-unit as the one among the K×L second correlation signals that indicates the largest correlation level.

In the above-described demodulation apparatus, in the weight assigning sub-unit, when the calculated values of power of the K×L second correlation signals are represented as In00, In10, . . . In(K−1)(L−1), values of power after the assignment of weights by the weight assigning sub-unit are represented as Out00, Out01, . . . Out(K−1)(L−1), and a given constant is represented as αi, the values of power after the assignment of weights by the weight assigning sub-unit are defined by Equation 1:

$$Out_{ij} = \alpha_i \sum_{n=i}^{i-1} In_{nj}.$$

Equation 1

With the above-stated construction, the demodulation apparatus of the present invention is not required to have as many integration units and spectrum emphasis filters as there are available transmission modes, which are required in the conventional technologies. This enables the circuit size of the demodulation apparatus to be reduced greatly.

More specifically, the conventional transmission mode detection method has a problem of a large circuit size since the method requires as many delay/correlation calculation units as the number of available effective symbol periods and as many integration units, power calculation units, spectrum emphasis filters, and maximum value detection units as the number of available transmission modes. Especially, the delay/correlation calculation units, integration units, and spectrum emphasis filters are generally constructed to use a memory, and the circuits of these units are one main factor of the large circuit size.

The demodulation apparatus of the present invention is not required to have the plurality of delay/correlation calculation units and as many integration units and spectrum emphasis filters as there are available transmission modes, which are required in the conventional technologies. This enables the circuit size of the demodulation apparatus to be reduced greatly.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5A shows the construction of the OFDM signal as an input signal. FIG. 5B shows a signal output from the first delay processing sub-unit 130. FIG. 5C shows a signal output from the first correlation calculation sub-unit 140.

FIGS. 7A-7D show how signals are generated by the second correlation calculation sub-unit 610. FIG. 7A shows a signal output from the first correlation calculation sub-unit 140. FIG. 7B shows a waveform that is obtained when the integration sub-unit 410 performs the integration onto the signal shown in FIG. 7A at the period of Tm0g0. FIG. 7C shows signals output from the second delay processing sub-unit 420. FIG. 7D shows signals output from the second correlation calculation sub-unit 610.

FIG. 8 is a block diagram showing the construction of the correlation detection sub-unit 450;

FIG. 21 shows correspondences between the transmission modes, effective symbol periods, and guard interval periods.

DESCRIPTION OF THE PREFERRED EMBODIMENT

<Outline>

The demodulation apparatus of the present invention is aimed to reduce the circuit size by removing the main factor of the large circuit size, namely by reducing the number of circuit components that use the memory.

For this purpose, the present invention detects the transmission mode, using a characteristic that a plurality of available transmission modes correspond, on a one-to-one basis, to OFDM symbol periods which are combinations of a guard interval period and an effective symbol period.

The following explains the demodulation apparatus of the present invention through an embodiment thereof.

It is presumed in the present embodiment that the OFDM signals are transmitted by the ISDB-T method, and that the demodulation apparatus of the present invention is loaded in a television receiver.

<Construction>

Figure 1:
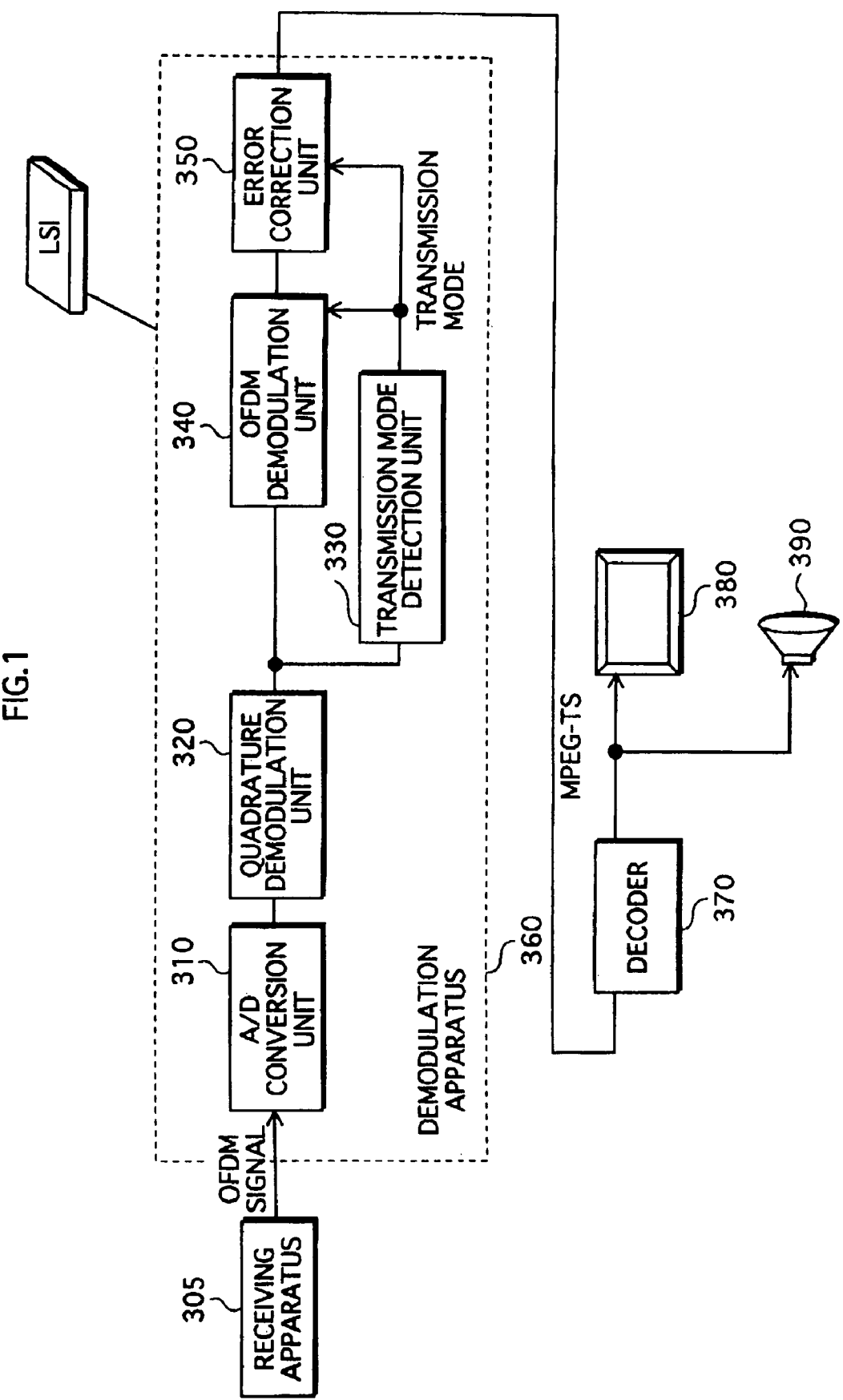
FIG. 1 is a functional block diagram showing the construction of a demodulation apparatus of the present invention.

FIG. 1 is a functional block diagram showing the construction of a demodulation apparatus of the present invention.

As shown in FIG. 1, a demodulation apparatus 360 includes an A/D (analog-to-digital) conversion unit 310, a quadrature demodulation unit 320, a transmission mode detection unit 330, an OFDM demodulation unit 340, and an error correction unit 350.

A television receiver set that includes the demodulation apparatus 360 also includes a receiving apparatus 305, a decoder 370, a display apparatus 380, and an audio output apparatus 390.

The receiving apparatus 305 receives a signal via the terrestrial digital broadcasting, converts the received signal into an OFDM (Orthogonal Frequency Division Multiplexing) signal by performing certain necessary processes on the received signal, and outputs the OFDM signal to the demodulation apparatus 360.

In the demodulation apparatus 360 that has received the OFDM signal from the receiving apparatus 305, first the A/D conversion unit 310 converts the received OFDM signal into a digital signal, and outputs the digital signal to the quadrature demodulation unit 320.

The quadrature demodulation unit 320, upon receiving the digital signal from the A/D conversion unit 310, converts it into a baseband signal by performing a quadrature demodulation onto the digital signal, and outputs the baseband signal to the transmission mode detection unit 330 and the OFDM demodulation unit 340.

The transmission mode detection unit 330 detects in which mode the received OFDM signal was transmitted, based on the baseband signal received from the quadrature demodulation unit 320.

The transmission mode detection unit 330 notifies the OFDM demodulation unit 340 and the error correction unit 350 of a transmission mode resulted from the detection.

The OFDM demodulation unit 340 receives the transmission mode from the transmission mode detection unit 330, demodulates the baseband signal received from the quadrature demodulation unit 320, based on the transmission mode, and outputs the demodulated baseband signal to the error correction unit 350.

The error correction unit 350 receives the transmission mode from the transmission mode detection unit 330, corrects errors of the demodulated baseband signal received from the OFDM demodulation unit 340, based on the transmission mode, and outputs a MPEG-TS (Moving Picture Experts Group-Transport Stream) signal resulted from the error correction.

The decoder 370 receives the MPEG-TS signal from the error correction unit 350, namely from the demodulation apparatus 360, and generates video and audio signals by decoding the received MPEG-TS signal, and outputs the video and audio signals to the display apparatus 380 and the audio output apparatus 390.

The display apparatus 380 and the audio output apparatus 390 reproduce video and audio from the video and audio signals received from the decoder 370.

Now, the transmission mode detection unit 330, which characterizes the demodulation apparatus of the present invention, will be described in detail.

Transmission symbols of the OFDM signal will be explained first, and then the basic principle of the transmission mode detection will be explained using a conventional, parallel-type transmission mode detection unit. This is because the transmission mode detection of the present invention is based on the same basic principle as the conventional one.

The explanation of the transmission mode detection unit of the present invention will follow this, and then a comparison will be made between the conventional and present invention transmission mode detection units.

<1. Transmission Symbols of OFDM Signal>

First, transmission symbols of the OFDM signal will be explained using the ISDB-T method as an example, with reference to FIGS. 2 and 3A.

Figure 3:
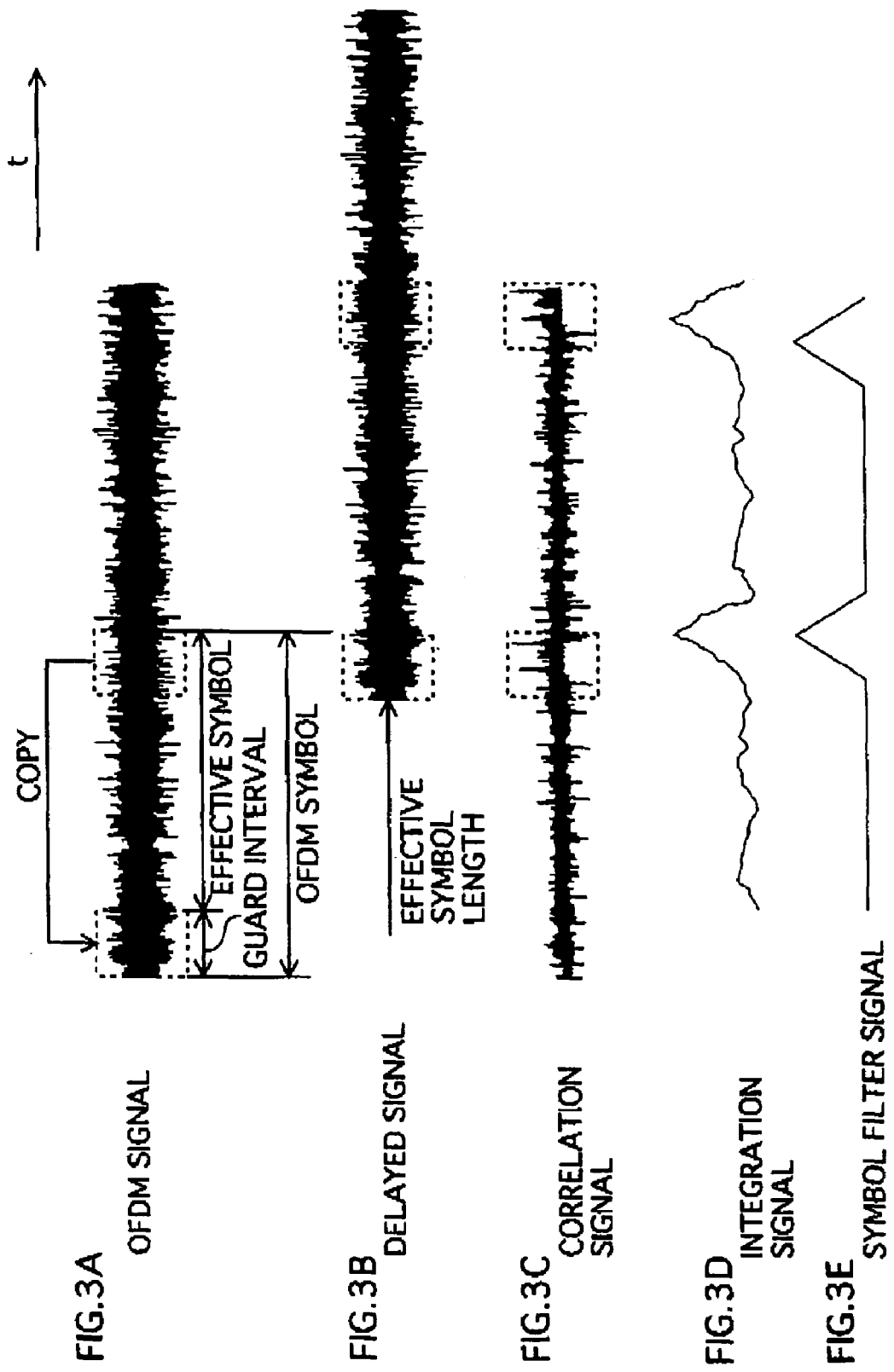
FIGS. 3A-3E show an outline of a transmission mode automatic detection process, FIGS. 3A-3E respectively showing signals that have been processed in the stated order.

Each transmission symbol is composed of an effective symbol and a guard interval, as shown in FIG. 3A.

The guard interval precedes the effective symbol, and has a copy of part of the effective symbol (in the ISDB-T method, the latter part thereof).

In the ISDB-T method, any combination of an effective symbol period and a guard interval period can be selected from the combinations shown in FIG. 21, as a transmission symbol period representing a transmission mode.

In the ISDB-T method, for example, "Model 1/16" represents a transmission mode that is a combination of effective symbol period "$Tm_0=2048$" and guard interval period "$Tm_0g_1=128$".

FIG. 21 shows correspondences between the transmission modes, effective symbol periods, and guard interval periods, wherein the values are expressed in units of sample times each of which is approximately 0.123 μs in the ISDB-T method. The period of the guard interval is expressed as a fraction of the period of the effective symbol (in this example, there are four types of guard interval periods: 1/32, 1/16, 1/8, and 1/4).

The transmitter can set the transmission mode to any of the available transmission modes. In the receiver, that is, the OFDM demodulation apparatus, the demodulation process and the error correction process are performed respectively by the OFDM demodulation unit 340 and the error correction unit 350, based on the transmission mode. Accordingly, the receiver needs to recognize the transmission mode in advance to perform the processes. For this purpose, either the transmission modes corresponding to the transmitters are set in the receiver in advance from outside, or the receiver automatically detects the transmission mode from the received signal.

When the transmission modes corresponding to the transmitters are set in the receiver in advance from outside, the receiver needs to be provided with a means for storing the relationships between the transmitters and the transmission modes. Also, since the transmission mode may be changed at any time, the information of the transmission mode needs to be updated as needed. On the other hand, if the receiver can automatically detect the transmission mode from the received signal, such means and updating are not required, enabling the receiver to receive a signal always in an optimum transmission mode. Accordingly, the latter method is considered to be indispensable for improving the usefulness of the OFDM demodulation apparatus.

<2. Basic Principle of Transmission Mode Detection>

Figure 2:
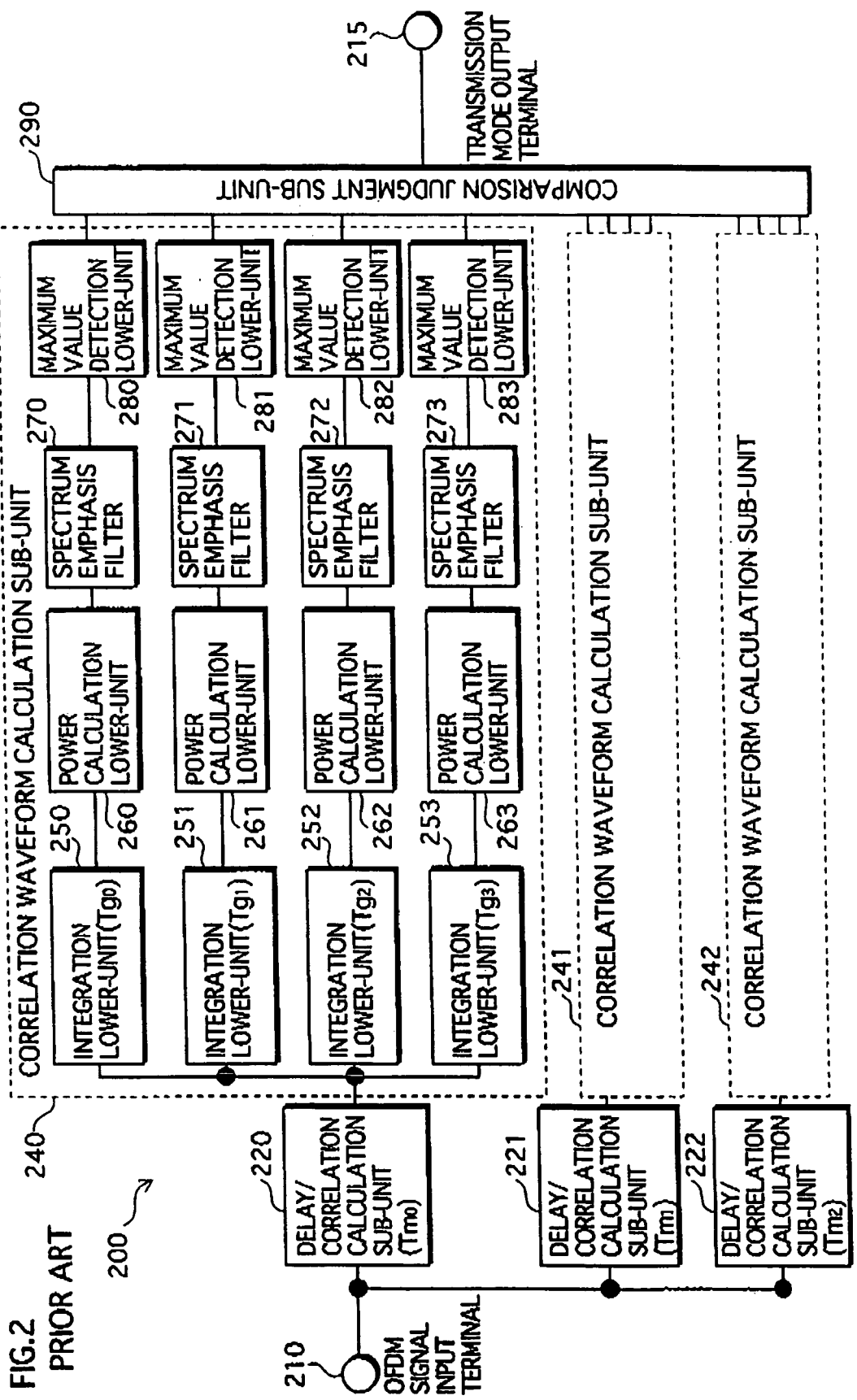
FIG. 2 is a functional block diagram showing the construction of a conventional transmission mode detection unit 200 adopting the ISDB-T method.

FIG. 2 is a functional block diagram showing the construction of a conventional transmission mode detection unit 200 adopting the ISDB-T method. In FIG. 2, "Tm0"–"Tm2" represent effective symbol periods, and "Tg0"–"Tm3" represent guard interval periods (see FIG. 21).

FIGS. 3A-3E show an outline of a transmission mode automatic detection process. FIGS. 3A-3E respectively show signals that have been processed in the stated order.

The transmission mode automatic detection process will be outlined as follows.

As described earlier, each transmission symbol of the OFDM signal is composed of an effective symbol and a guard interval, which has a copy of part of the effective symbol (in the ISDB-T method, the latter part thereof). As a result, a strong correlation is observed between an original OFDM signal and a signal generated by delaying the original OFDM signal by the effective symbol period. This is because the guard interval of the delayed signal is equal to the latter part of the effective symbol of the original OFDM signal.

To make use of the correlation, first, a correlation between an input OFDM signal and a signal generated by delaying the input OFDM signal by the effective symbol period is calculated (see FIGS. 3B and 3C).

The result of the calculation shows a strong correlation with the input OFDM signal, at the guard interval of the delayed signal.

Next, the correlation calculation result is integrated in terms of each period that constitutes the correlation calculation result, each period having a predetermined period If the period for integration is equal to the guard interval period set by the transmitter, a triangular waveform, whose peak corresponds to a value obtained by integrating a period that overlaps the guard interval, is observed cyclically in the integration signal (see FIG. 3D).

To emphasize the waveform, the integration signal is accumulated for each transmission symbol period (the effective symbol period+the guard interval period) (see FIG. 3E). This process is called a spectrum emphasis filter or a symbol filter.

As understood from the above description, only if the delayed period of effective symbol, the integration period, and the symbol filter accumulation period matches the effective symbol period, the guard interval period, and the OFDM symbol period of the transmission mode set by the transmitter, a high value is observed cyclically in the output from the symbol filter.

The receiver causes the symbol filter to output, in terms of a received signal, a plurality of results with the possible transmission modes, and determines a transmission mode corresponding to a result that has the largest value, as the transmission mode of the received signal.

Here, the conventional transmission mode detection unit 200 will be explained.

The conventional transmission mode detection unit 200 includes an input terminal 210, an output terminal 215, delay/correlation calculation sub-units 220-222, correlation waveform calculation sub-units 240-242, and a comparison detection sub-unit 290.

The input terminal 210 receives an OFDM signal that has been subjected to the A/D conversion and the quadrature demodulation. The input OFDM signal (see FIG. 3A), namely an input signal, branches into the delay/correlation calculation sub-units 220-222.

The delay/correlation calculation sub-units 220-222 delay the branched input signals by the effective symbol periods (Tm0, Tm1, Tm2), calculate correlations between the delayed signals (see FIG. 3B) and the branched input signals, and output correlation signals (see FIG. 3C), respectively.

The delay/correlation calculation sub-unit 220 generates a delayed signal by delaying the input signal by effective symbol period Tm0 (=2048), and generate a correlation signal by calculating a correlation between the delayed signal and the input signal. The delay/correlation calculation sub-units 221 and 222 perform similarly.

The correlation waveform calculation sub-unit 240 receives, from the delay/correlation calculation sub-unit 220, the correlation signal corresponding to effective symbol period Tm0, calculates a correlation waveform for each of the guard interval periods (Tm0g0-Tm0g3) in terms of effective symbol period Tm0, and obtains the maximum value for each correlation waveform.

The correlation waveform calculation sub-unit 240 includes integration lower-units 250-253, power calculation lower-units 260-263, spectrum emphasis filters 270-273, and maximum value detection lower-units 280-281.

The integration lower-units 250-253 generate integration signals (see FIG. 3D) by performing the integration in terms of the guard interval periods (Tg0-Tg3), respectively, and output the integration signals.

The power calculation lower-units 260-263 generate power signals by calculating power of the integration signals output from the integration lower-units 250-253, respectively, and output the power signals. The power signals are absolute value sum signals.

The spectrum emphasis filters 270-273 generate spectrum-emphasized signals (see FIG. 3E) by emphasizing the power signals output from the power calculation lower-units 260-263 in terms of the transmission symbol periods (Tm0+Tm0Tg0, Tm0+Tm0Tg1, Tm0+Tm0Tg2, Tm0+Tm0Tg3), respectively, and output the spectrum-emphasized signals.

The passing/emphasis bands of these filters are:
spectrum emphasis filter 270=1/(Tm0+Tm0Tg0)T;
spectrum emphasis filter 271=1/(Tm0+Tm0Tg1)T;
spectrum emphasis filter 272=1/(Tm0+Tm0Tg2)T; and
spectrum emphasis filter 273=1/(Tm0+Tm0Tg3)T, and their harmonic components, respectively.

The spectrum emphasis filters 270-273 are reset as necessary, depending on the set observation period.

The maximum value detection lower-units 280-283 receive the spectrum-emphasized signals from the spectrum emphasis filters 270-273, detect the maximum values from the received spectrum-emphasized signals, and hold the maximum values, respectively.

The correlation waveform calculation sub-unit 241 receives, from the delay/correlation calculation sub-unit 221, the correlation signal corresponding to effective symbol period Tm1, calculates a correlation waveform for each of the guard interval periods (Tm1g0-Tm1g3) in terms of effective symbol period Tm1, and obtains the maximum value for each correlation waveform. The correlation waveform calculation sub-unit 241 has the same construction as the correlation waveform calculation sub-unit 240.

The correlation waveform calculation sub-unit 242 receives, from the delay/correlation calculation sub-unit 222, the correlation signal corresponding to effective symbol period Tm2, calculates a correlation waveform for each of the guard interval periods (Tm2g0-Tm2g3) in terms of effective symbol period Tm2, and obtains the maximum value for each correlation waveform. The correlation waveform calculation sub-unit 242 has the same construction as the correlation waveform calculation sub-unit 240.

The comparison detection sub-unit 290 detects, among 12 maximum values for 12 types of correlation waveperiods output from the correlation waveform calculation sub-units 240-242, a maximum value that has the maximum power, detects a transmission mode that corresponds to the detected maximum value, and outputs the detected transmission mode as the transmission mode of the received signal, via the output terminal 215.

<3. Transmission Mode Detection Unit of Present Invention>

Figure 4:
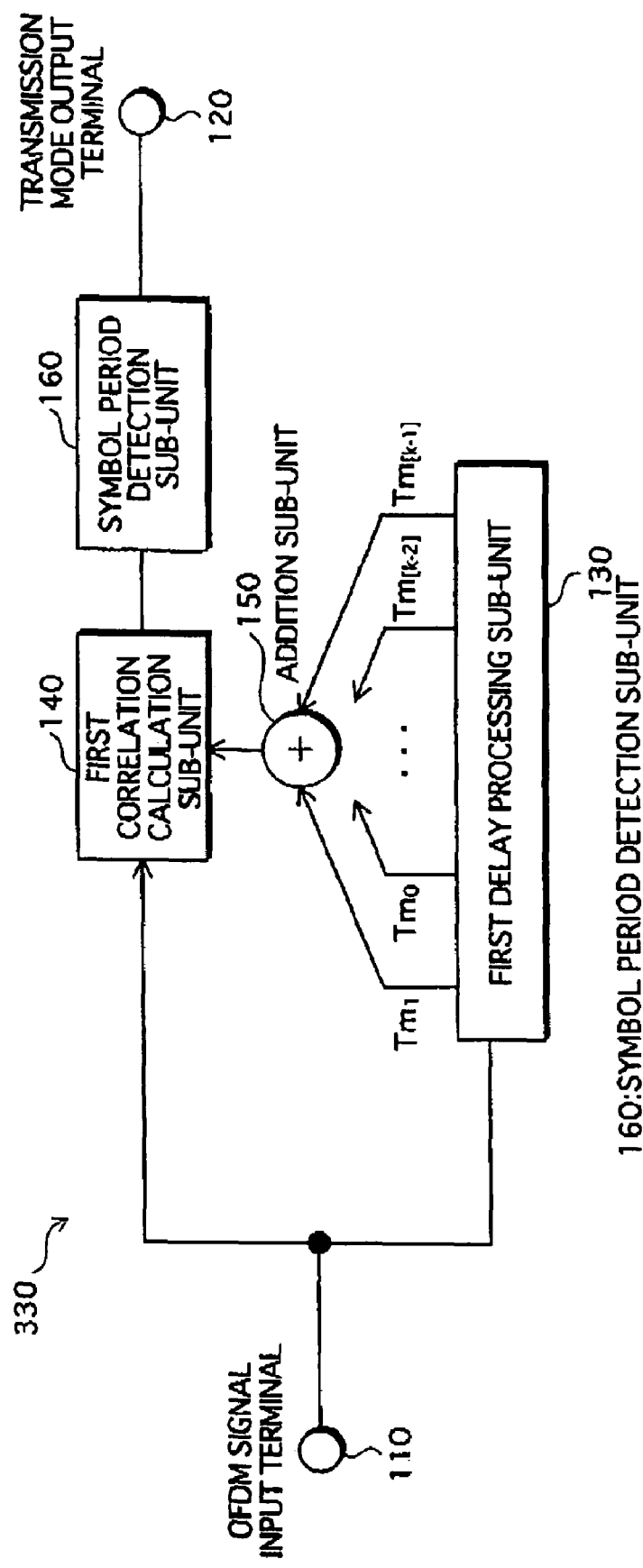
FIG. 4 is a functional block diagram showing the construction of the transmission mode detection unit 330 of the demodulation apparatus 360 in the embodiment of the present invention.

FIG. 4 is a functional block diagram showing the construction of the transmission mode detection unit 330 of the demodulation apparatus 360 in the present embodiment of the present invention.

As shown in FIG. 4, the transmission mode detection unit 330 includes an input terminal 110, an output terminal 120, a first delay processing sub-unit 130, a first correlation calculation sub-unit 140, an addition sub-unit 150, and a cycle detection sub-unit 160.

It is presumed that the demodulation apparatus 360 of the present invention receives an OFDM signal that has been transmitted in a transmission mode selected from "K×L" types (here, K and L are each a given natural number) of transmission modes. The transmission mode is represented as $S_{ij}$ ($0 \leq i < K$, $0 \leq j < L$).

This will be explained in detail using an example in which it is presumed that "K" represents the number of types of the effective symbol period and takes value "3", and "L" represents the number of types of fractions used to indicate the guard interval period and takes value "4" (see the table shown in FIG. 21).

The input terminal 110 receives an OFDM signal that has been subjected to the A/D conversion performed by the A/D conversion unit 310 and the quadrature demodulation performed by the quadrature demodulation unit 320 (see FIG. 1). The input OFDM signal, namely an input signal, branches into the first delay processing sub-unit 130 and the first correlation calculation sub-unit 140.

The first delay processing sub-unit 130 outputs K signals per input signal. The K output signals are generated by delaying the input signal by K different periods, respectively. More specifically, the first delay processing sub-unit 130 generates K signals by delaying the input signal by (Tm0, Tm1, ... Tm[K−1]).

For example, the K types of periods include "Tm0=2048", "Tm1=4096", and "Tm2=8192".

The addition sub-unit 150 calculates the total sum of all signals output from the first delay processing sub-unit 130. That is to say, the addition sub-unit 150 receives K delayed signals from 130, and outputs one signal to the first correlation calculation sub-unit 140.

The first correlation calculation sub-unit 140 calculates a correlation between the signal received from the input terminal 110 and the signal received from the addition sub-unit 150. For example, if the input signal is a complex signal, the correlation is obtained by multiplying the complex conjugates of the input signal and the signal output from the addition sub-unit 150.

The first correlation calculation sub-unit 140 outputs the calculated correlation value to the cycle detection sub-unit 160 as a signal.

The cycle detection sub-unit 160 detects a cycle that shows a high correlation from the first correlation calculation sub-unit 140, detects the transmission mode by the cycle, and outputs the transmission mode to the output terminal 120.

Figure 5:
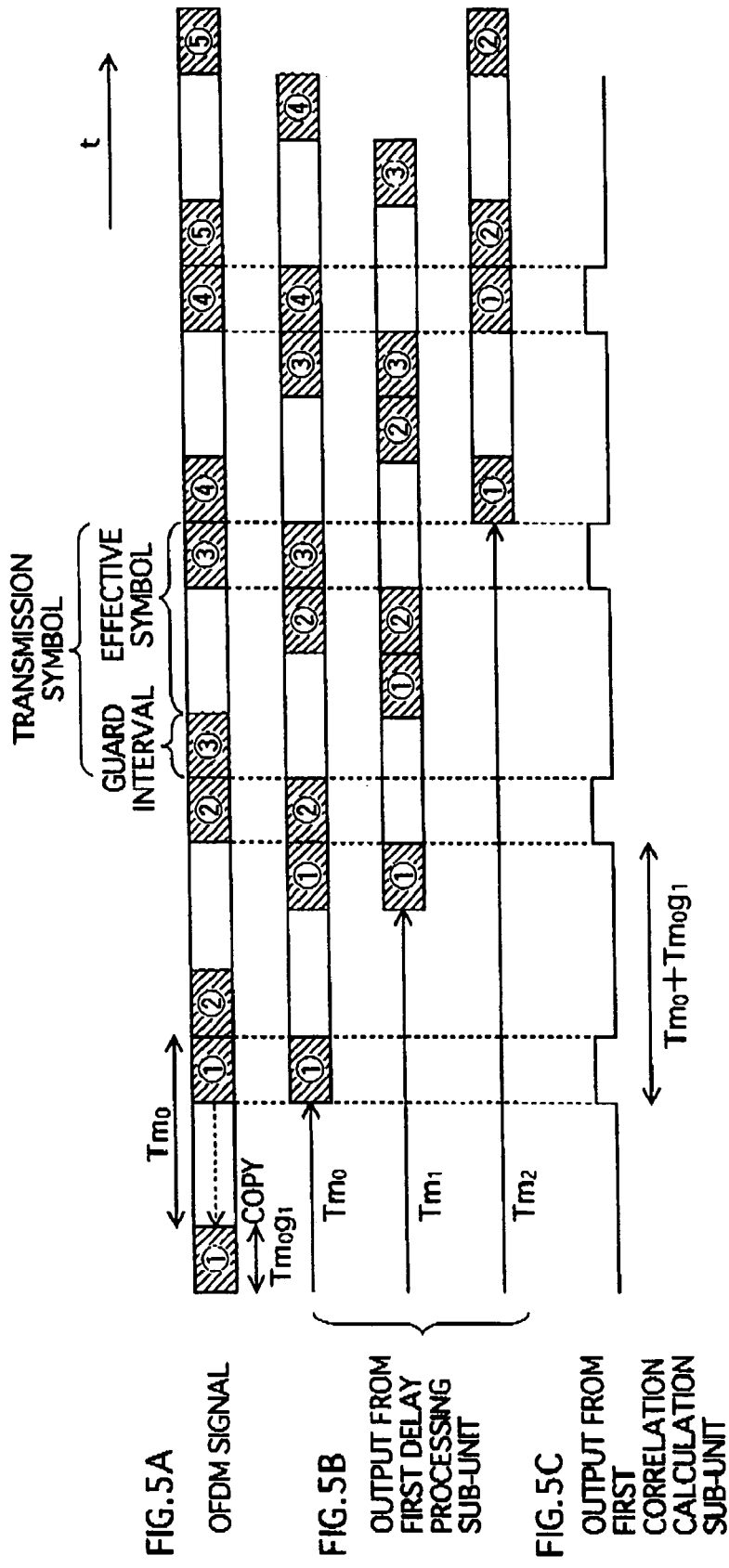
FIGS. 5A-5C shows how a signal output from the first correlation calculation sub-unit 140 is generated.

The following describes in detail how the OFDM signal input via the input terminal 110 is converted and output from the first correlation calculation sub-unit 140, with reference to FIG. 5.

Also, how the cycle detection sub-unit 160 uses the signal output from the first correlation calculation sub-unit 140 to detect the correlation cycle and detects the transmission mode will be explained in <3-2. Operation of Cycle Detection Sub-Unit 160>, with reference to FIGS. 6-15.

<3-1. Signal Output from First Correlation Calculation Sub-Unit 140>

FIGS. 5A-5C shows how a signal output from the first correlation calculation sub-unit 140 is generated.

FIG. 5A shows the construction of the OFDM signal as an input signal. The OFDM signal is input via the input terminal 110. In this example, it is presumed that the effective symbol period is represented by "$Tm_0$" and the guard interval period is represented by "$Tm_0 g_1$".

As described earlier in <1. Transmission Symbols of OFDM Signal>, each transmission symbol is composed of an effective symbol and a guard interval, and the guard interval has a copy of part of the effective symbol (in the example shown in FIG. 5, the latter part thereof).

In FIG. 5, each diagonally shaded area indicates a guard interval or a part of an effective symbol that is copied to a guard interval. The same numbers in the shaded areas indicate that the areas have the same content.

FIG. 5B shows a signal output from the first delay processing sub-unit 130.

In the example shown in FIG. 5, the first delay processing sub-unit 130 outputs three signals generated by delaying the input signal by three different periods: "Tm0=2048", "Tm1=4096", and "Tm3=8192".

The addition sub-unit 150 generates a signal by adding up the three delayed signals output from the first delay processing sub-unit 130, and outputs the generated signal.

FIG. 5C shows a signal output from the first correlation calculation sub-unit 140.

The first correlation calculation sub-unit 140 calculates a correlation between the input signal and the signal output from the addition sub-unit 150.

The effective symbol period of the input signal is Tm0. Accordingly, out of the three delayed signals output from the first delay processing sub-unit 130, a delayed signal that was delayed by Tm0 has a strong correlation with the input signal at the guard interval period of the delayed signal. Also, the signal output from the addition sub-unit 150, which is a sum of the delayed signals output from the first delay processing sub-unit 130, has a strong correlation with the input signal at a period thereof corresponding to the guard interval period of the delayed signal delayed by Tm0.

Accordingly, a strong correlation with the input signal is observed cyclically at the guard interval of the signal output from the first correlation calculation sub-unit 140, and the cycle period is equal to the transmission symbol period (Tm0+Tm0g1).

If the input signal has been transmitted in another transmission mode, a strong correlation with the input signal should be observed at the guard interval of any other one of the delayed signals output from the first delay processing sub-unit 130 shown in FIG. 3B.

For example, if the input signal has been transmitted in Mode 2 for effective symbol period "Tm1" with guard interval period "Tm1g1", a strong correlation with the input signal is observed at the guard interval of one of the delayed signals output from the first delay processing sub-unit 130.

Accordingly, a strong correlation with the input signal is observed cyclically at the guard interval of the signal output from the addition sub-unit 150, and the cycle period is equal to the transmission symbol period of the input signal.

It is therefore possible to make use of this characteristic and detects the transmission mode of the input signal uniquely by observing the cycle at which a strong correlation appears.

As understood from the description up to now, the transmission mode detection unit 330 in the present embodiment of the present invention can detect the transmission mode with far less components than the conventional transmission mode detection unit 200, which includes, for each effective symbol, delay/correlation calculation sub-units 220-222, integration lower-units 250-253 and the like (see FIG. 2).

More specifically, to generate a signal that cyclically shows correlation with the input signal and indicates the transmission mode, while the conventional technology requires three delay/correlation calculation units and 12 integration units, the present invention requires only one delay processing unit, one correlation calculation unit, and one addition unit.

This makes it possible to achieve a reduced circuit size, compared with the conventional circuit structure.

It should be noted here that the signal output from the first correlation calculation sub-unit 140 has a different waveform from the signal output from the 250 of the conventional technology, for example. The present invention adopts the following method for detecting the cycle and the transmission mode.

<3-2. Operation of Cycle Detection Sub-Unit 160>

Figure 6:
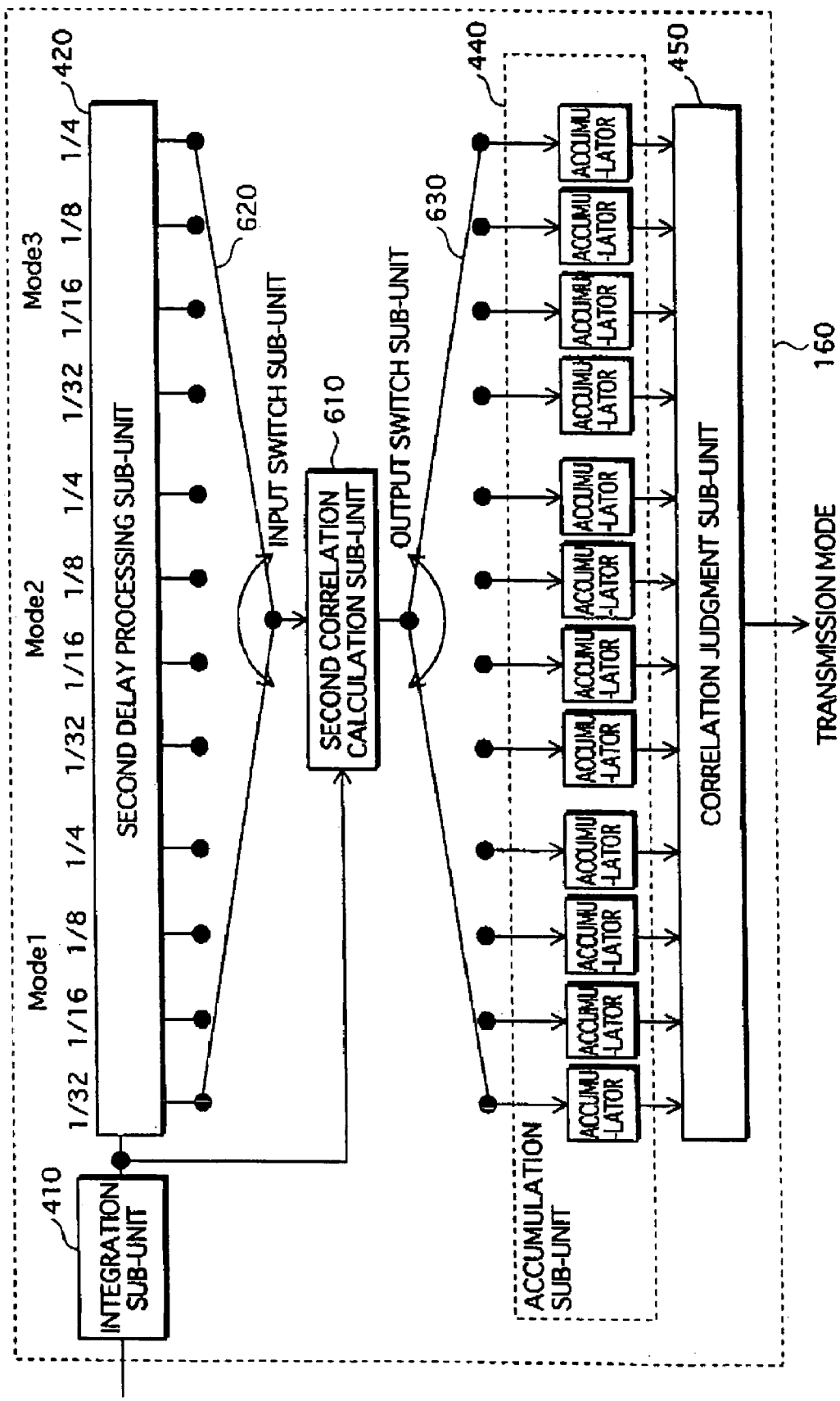
FIG. 6 is a functional block diagram showing the construction of the cycle detection sub-unit 160 that is included in the transmission mode detection unit 330 in the embodiment of the present invention.

FIG. 6 is a functional block diagram showing the construction of the cycle detection sub-unit 160 that is included in the transmission mode detection unit 330.

It should be noted here that the present embodiment is described based on the premise that the ISDB-T method shown in FIG. 21 is adopted. However, the transmission mode detection unit with the same construction can deal with other combinations that are not shown in FIG. 21.

The construction of the cycle detection sub-unit 160 will be explained with reference to FIG. 6.

The cycle detection sub-unit 160 includes an integration sub-unit 410, a second correlation calculation sub-unit 610, a second delay processing sub-unit 420, an accumulation sub-unit 440, a correlation detection sub-unit 450, an input switch sub-unit 620, and an output switch sub-unit 630. The accumulation sub-unit 440 includes K×L accumulators.

The integration sub-unit 410 integrates a predetermined period of the signal received from the first correlation calculation sub-unit 140.

As shown in FIG. 5C, the signal output from the first correlation calculation sub-unit 140 shows a correlation with the input signal in cycles of transmission symbol period (Tm0+Tm0g1). However, since the signal is a result of calculating a correlation between the input signal and the signal output from the addition sub-unit 150, which is a sum of a plurality of delayed signals, the signal from the first correlation calculation sub-unit 140 is influenced by the other delayed signals delayed by the effective symbol periods other than Tm0. Due to this, the correlation observed in the signal from the first correlation calculation sub-unit 140 at the guard interval period is very weak.

For this reason, the integration sub-unit 410 is provided to emphasize the correlation waveform.

Although any period may be set to the integration period for the integration sub-unit 410, it is preferable that the shortest guard interval period (in this example, Tm0g0) is set to the integration period. This is because if an excessively great period is set to the integration period, the correlation is interfered by other delayed signals delayed by the effective symbol periods other than the guard interval period, and the correlation is not emphasized enough.

The signal having been subjected to the integration branches into the second delay processing sub-unit 420 and the second correlation calculation sub-unit 610.

The second delay processing sub-unit 420 receives the "period-integrated" signal, and outputs K×L signals, which are generated by delaying the input signal by K×L different transmission symbol periods, respectively.

Here, the number "K×L" is equal to the number of types of transmission symbol periods, as follows. The transmission symbol period is a result of adding the effective symbol period to the guard interval period. Accordingly, the number of types of transmission symbols is a result of multiplying "K" (the number of types of effective symbols) by "L" (the number of types of fractions used to indicate the guard interval period).

The second delay processing sub-unit 420 has K×L outputs via which the second delay processing sub-unit 420 output signals generated by delaying the input signal by (Tm0+Tm0Tg0, Tm0+Tm0Tg1, . . . TmK+TmKTgL), respectively.

More specifically, in this example, the K×L periods are 12 periods: "Tm0+Tm0Tg0=2048+64", "Tm0+Tm0Tg1=2048+128", ... "Tm2+Tm2Tg3=8192+2048" (see FIG. 21).

The input switch sub-unit 620 switches between the outputs of the second delay processing sub-unit 420 to output one signal at a time, so that the signals are output to the second correlation calculation sub-unit 610 on a one-to-one basis.

The output switch sub-unit 630 receives signals from the second correlation calculation sub-unit 610 one at a time, and outputs the received signals to corresponding accumulators of the accumulation sub-unit 440, in sequence.

The second correlation calculation sub-unit 610 receives K×L delayed signals from the input switch sub-unit 620 one at a time, and calculates a correlation between the signal output from the integration sub-unit 410 and each of the delayed signals output from the K×L outputs of the second delay processing sub-unit 420.

The correlation is obtained by multiplying the complex conjugates of the signal from the integration sub-unit 410 (the result of integration) and the delayed signal from the second delay processing sub-unit 420, for example.

The accumulation sub-unit 440 receives the signals output from the second correlation calculation sub-unit 610 via the output switch sub-unit 630, and causes each accumulator to perform a multiplication for a predetermined time period.

These multiplications maximize a value corresponding to the transmission mode of the input signal.

The predetermined time period during which each accumulator performs a multiplication is set to be long enough to output a result maximized enough for the correlation detection sub-unit 450 to detect the transmission mode. More specifically, the predetermined time period is obtained by multiplying the largest transmission symbol period among those of available transmission modes by an appropriate number.

For example, in the ISDB-T method, "Mode 3 with guard interval period ¼" is the largest transmission symbol period which is, in this example, (8192+2048). Here, the time period of the largest transmission symbol period (symbol time) is expressed as (8192+2048)×0.123 µs=approximately 1.26 ms. Thus, if the appropriate number is 32, the predetermined time period during which each accumulator performs a multiplication is 1.26 ms×32=40.32 ms. Accordingly, the predetermined time period is approximately 40 ms in this example.

Signals are output from the accumulation sub-unit 440 to the correlation detection sub-unit 450.

The correlation detection sub-unit 450 will be described later with reference to FIG. 8 and the like.

Here, how the K×L signals are generated by the second correlation calculation sub-unit 610 will be explained, with reference to FIGS. 7A-7D.

FIGS. 7A-7D show how the K×L signals are generated by the second correlation calculation sub-unit 610.

FIG. 7A shows a signal output from the first correlation calculation sub-unit 140 to the cycle detection sub-unit 160 (see FIG. 5C).

It is presumed here that FIG. 7A shows a correlation waveform of the signal that was transmitted in Mode 1 with guard interval period 1/16.

FIG. 7B shows a waveform that is obtained when the integration sub-unit 410 performs the integration onto the signal shown in FIG. 7A at the period of Tm0g0. This process emphasizes the correlation waveform.

FIG. 7C shows signals output from the second delay processing sub-unit 420. In this example, only four signals that have been delayed respectively by four transmission symbol periods in the Mode 1 transmission mode, for the sake of convenience. A similar process is performed for other transmission modes.

FIG. 7D shows signals output from the second correlation calculation sub-unit 610.

The second delay processing sub-unit 420 generates delayed signals by delaying a signal by different transmission symbol periods for the corresponding transmission modes, respectively. The signal resulted from the integration and output from the integration sub-unit 410 shows a strong correlation with the input signal in cycles of the transmission symbol period of the transmission mode in which the input signal was transmitted. The second correlation calculation sub-unit 610 calculates a correlation between the period-integrated signal output from the integration sub-unit 410 and each of the delayed signals output from the second delay processing sub-unit 420. Therefore, a signal output from the second correlation calculation sub-unit 610 resulted from calculating a correlation with a delayed signal that was delayed by the transmission symbol period of the input signal shows a strong correlation at regular intervals (see the signal for (Mode 1 1/16) in FIG. 7D), but other signals output from the second correlation calculation sub-unit 610 resulted from calculating a correlation with the other delayed signals show weak correlations (see the signals for (Mode 1 1/32) and the like in FIG. 7D).

Now, the correlation detection sub-unit 450 will be explained with reference to FIGS. 8-15.

FIG. 8 is a block diagram showing the construction of the correlation detection sub-unit 450.

As shown in FIG. 8, the correlation detection sub-unit 450 includes a power calculation lower-unit 530, a weight calculation lower-unit 540, and a maximum value detecting lower-unit 550. The power calculation lower-unit 530 includes K×L power calculators.

The power calculation lower-unit 530 calculates the power of each signal output from the accumulation sub-unit 440. The power can be obtained by calculation as an absolute value or an $n^{th}$ power of an absolute value.

The weight calculation lower-unit 540 assigns weights to the outputs of the power calculation lower-unit 530 in a predetermined manner.

The maximum value detecting lower-unit 550 detects the largest value among those of outputs of the weight calculation lower-unit 540, and detects a transmission mode having the largest value as the transmission mode of the input signal, and outputs the transmission mode.

The reason why the weight calculation lower-unit 540 assigns weights is as follows.

The accumulation sub-unit 440 maximizes a value corresponding to the transmission mode of the input signal by causing each accumulator to multiply each output from the second correlation calculation sub-unit 610 for a predetermined time period.

However, for example, Mode 2 with guard interval period 1/16 has a cycle twice that of Mode 1 with guard interval period 1/16. In this case, if the transmission mode of the input signal is Mode 1 with guard interval period 1/16, a multiplication output for Mode 2 with guard interval period 1/16 is also maximized. This also applies to Mode 3 with guard interval period 1/16.

Accordingly, even if a comparison is made among the outputs from the accumulators of the accumulation sub-unit 440, the transmission mode of the input signal cannot be detected.

Now, how weights are assigned will be described with reference to FIGS. 9-15.

Figure 9:
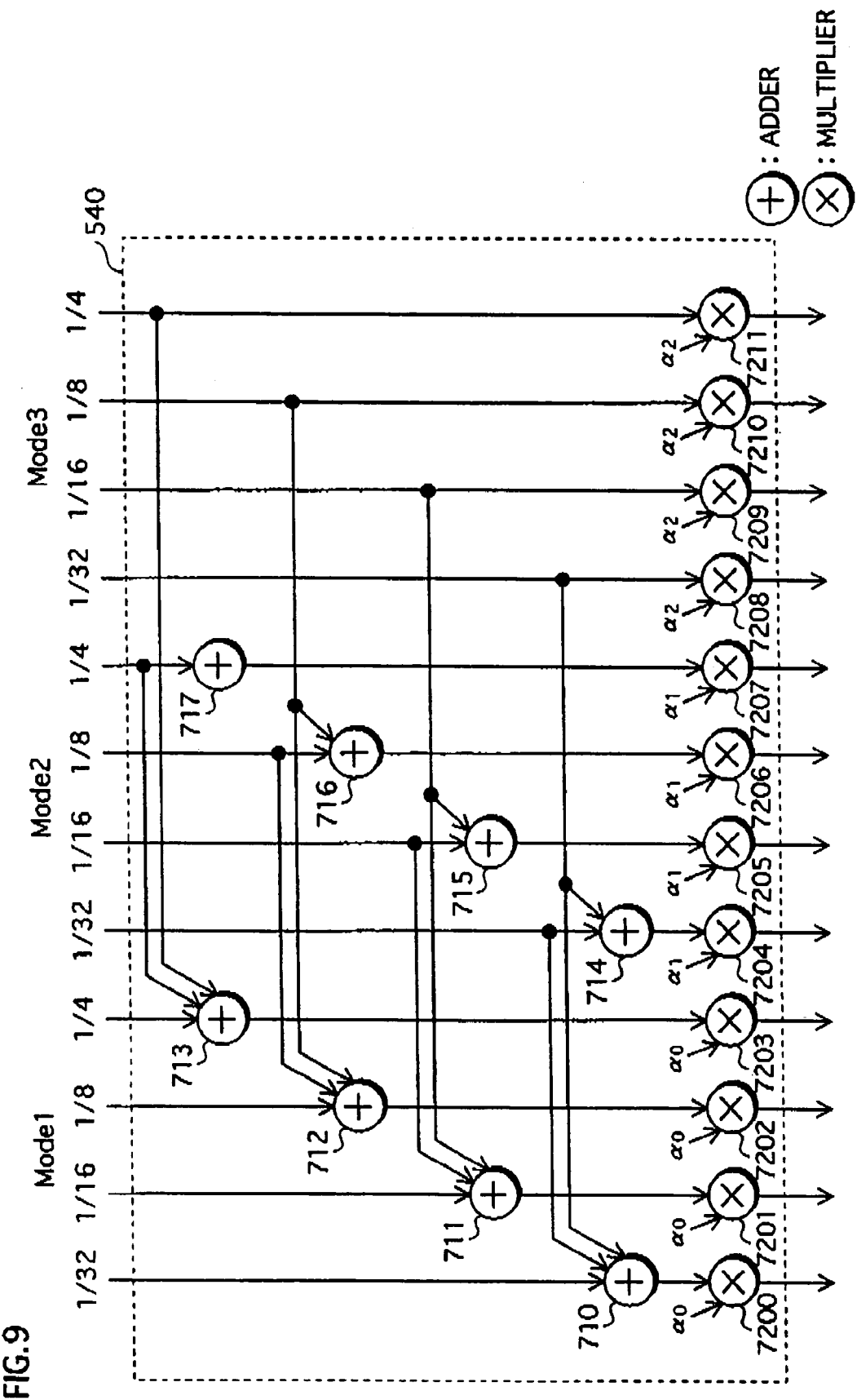
FIG. 9 is a block diagram showing the construction of the weight calculation lower-unit 540.
Figure 10A:
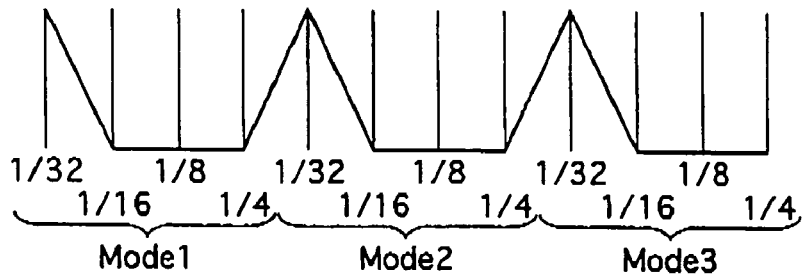
FIGS. 10A-10D show results of the power calculations performed on input signals having been transmitted in Mode 1.
Figure 10B:
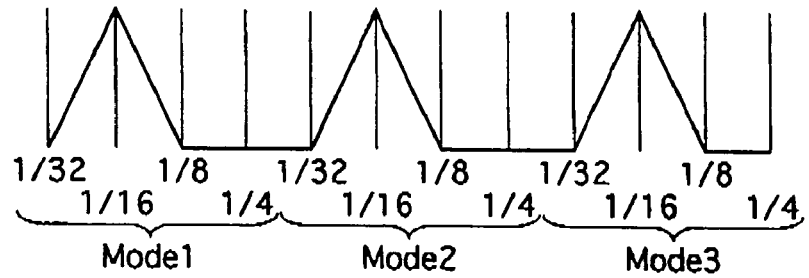
Figure 10C:
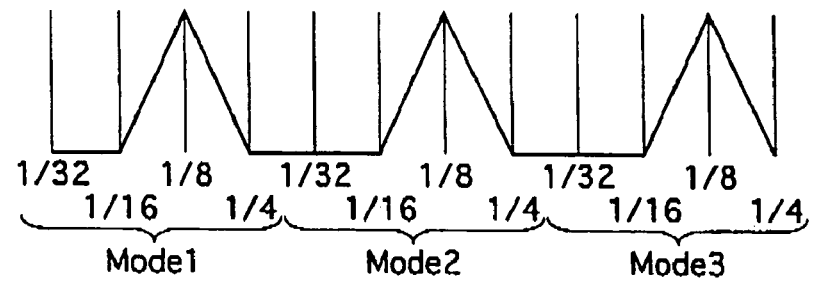
Figure 10D:
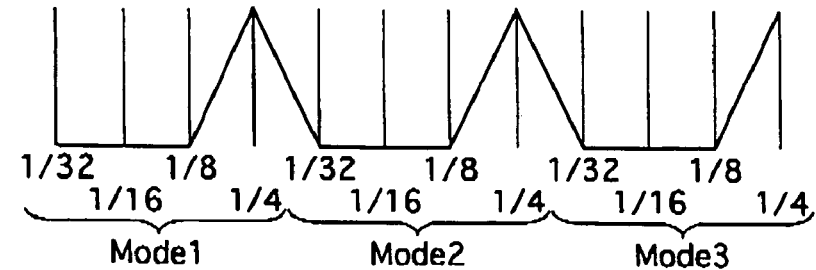
Figure 11A:
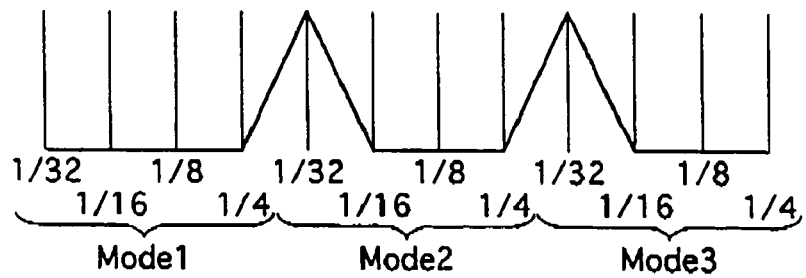
FIGS. 11A-11D show results of the power calculations performed on input signals having been transmitted in Mode 2.
Figure 11B:
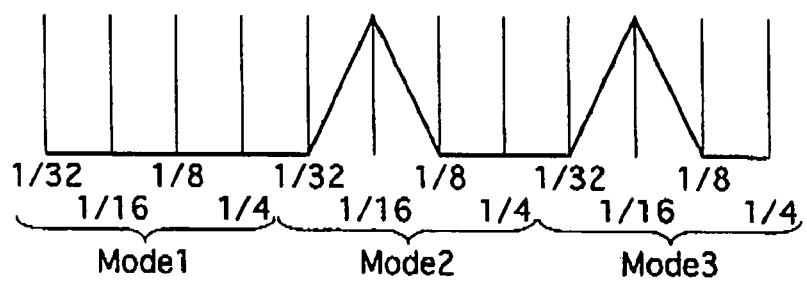
Figure 11C:
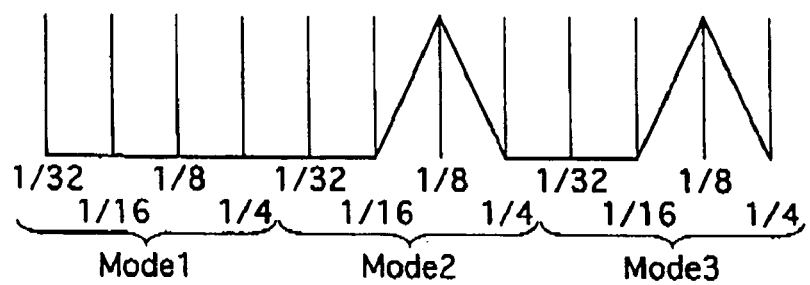
Figure 11D:
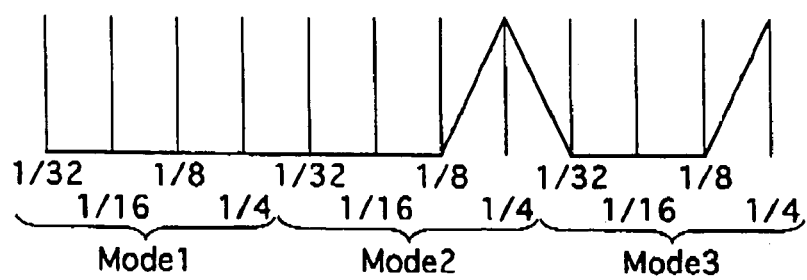
Figure 12A:
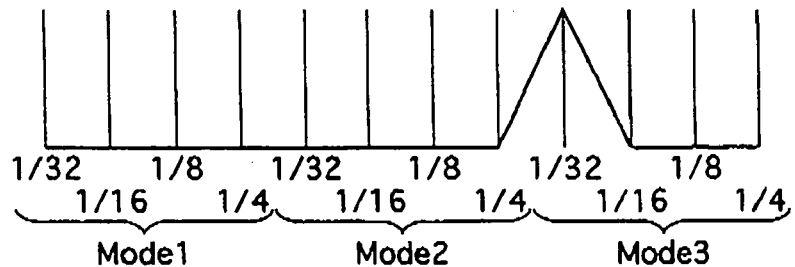
FIGS. 12A-12D show results of the power calculations performed on input signals having been transmitted in Mode 3.
Figure 12B:
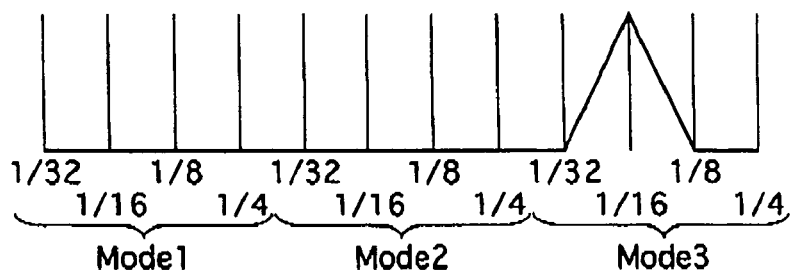
Figure 12C:
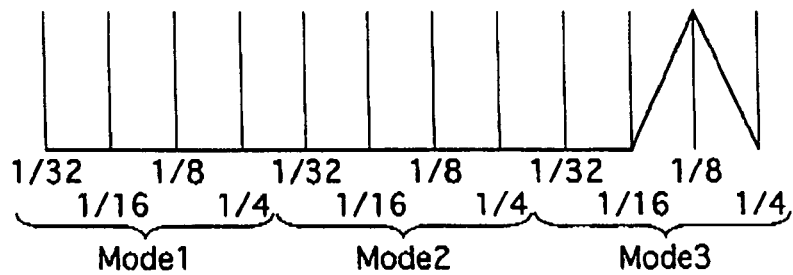
Figure 12D:
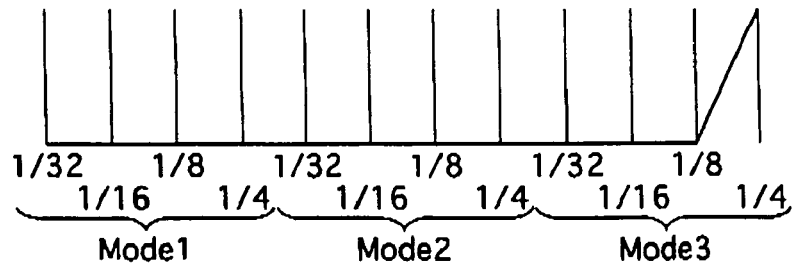

FIG. 9 is a block diagram showing the construction of the weight calculation lower-unit 540.

In the weight calculation lower-unit 540, when an input signal is represented as In00, In10, . . . In(K−1)(L−1), an output signal is represented as Out00, Out01, . . . Out(K−1)(L−1), a given constant is represented as αi, the output signal is defined by the following Equation 1.

$$Out_{ij} = \alpha_i \sum_{n=i}^{i-1} In_{nj} \qquad \text{Equation 1}$$

The Equation 2 is satisfied.

$$\begin{cases} 3\alpha_0 > 2\alpha_1 > \alpha_2 \\ 2\alpha_1 > 2\alpha_0 > \alpha_2 \\ \alpha_2 > \alpha_0 > \alpha_1 \end{cases} \qquad \text{Equation 2}$$

For example, Equation 2 is satisfied when α0=1, α1=1.25, and α2=1.5.

In this example, the weight calculation lower-unit 540 has the construction in the case of K=3 and L=4.

An adder 710 adds up all outputs corresponding to guard interval period 1/32 among the outputs from the power calculation lower-unit 530, namely adds up outputs for the input signals transmitted in Mode 1 with guard interval period 1/32, Mode 2 with guard interval period 1/32, and Mode 3 with guard interval period 1/32.

An adder 711 adds up all outputs corresponding to guard interval period 1/16 among the outputs from the power calculation lower-unit 530, namely adds up outputs for the input signals transmitted in Mode 1 with guard interval period 1/16, Mode 2 with guard interval period 1/16, and Mode 3 with guard interval period 1/16.

An adder 712 adds up all outputs corresponding to guard interval period 1/8 among the outputs from the power calculation lower-unit 530, namely adds up outputs for the input signals transmitted in Mode 1 with guard interval period 1/8, Mode 2 with guard interval period 1/8, and Mode 3 with guard interval period 1/8.

An adder 713 adds up all outputs corresponding to guard interval period 1/4 among the outputs from the power calculation lower-unit 530, namely adds up outputs for the input signals transmitted in Mode 1 with guard interval period 1/4, Mode 2 with guard interval period 1/4, and Mode 3 with guard interval period 1/4.

An adder 714 adds up outputs corresponding to Mode 2 with guard interval period 1/32 and Mode 3 with guard interval period 1/32, among the outputs from the power calculation lower-unit 530.

An adder 715 adds up outputs corresponding to Mode 2 with guard interval period 1/16 and Mode 3 with guard interval period 1/16, among the outputs from the power calculation lower-unit 530.

An adder 716 adds up outputs corresponding to Mode 2 with guard interval period 1/8 and Mode 3 with guard interval period 1/8, among the outputs from the power calculation lower-unit 530.

An adder 717 adds up outputs corresponding to Mode 2 with guard interval period 1/4 and Mode 3 with guard interval period 1/4, among the outputs from the power calculation lower-unit 530.

Multipliers 7200-7203 multiply values output from the adders 710-713 by a predetermined value α0, respectively.

Multipliers 7204-7207 multiply values output from the adders 714-717 by a predetermined value α1, respectively.

Multipliers 7208-7211 multiply values output from the power calculation lower-unit 530 by a predetermined value α2, respectively.

FIGS. 10A-10D, FIGS. 11A-11D, and FIGS. 12A-12D show results of the power calculations output from the power calculation lower-unit 530 to the weight calculation lower-unit 540. FIGS. 13A-13D, FIGS. 14A-14D, and FIGS. 15-15D show results of the weight assignments output from the weight calculation lower-unit 540, FIGS. 10A-10D show results of the power calculations performed on input signals having been transmitted in Mode 1 with guard interval periods 1/32, 1/16, 1/8, and 1/4, respectively, and output from the power calculation lower-unit 530.

These signals output from the power calculation lower-unit 530 are results of the power calculations performed on the input signals which are received from the accumulation sub-unit 440, where the input signals are multiplied for the predetermined time period that is long enough to output results maximized enough for the correlation detection sub-unit 450 to detect the transmission mode.

When a signal transmitted in Mode 1 with a certain guard interval period is received, part of the output from the power calculation lower-unit 530 corresponding to the certain guard interval period is maximized for Modes 2 and 3, as well as for Mode 1.

FIGS. 11A-11D show results of the power calculations performed on input signals having been transmitted in Mode 2 with guard interval periods 1/32, 1/16, 1/8, and 1/4, respectively, and output from the power calculation lower-unit 530.

When a signal transmitted in Mode 2 with a certain guard interval period is received, part of the output from the power calculation lower-unit 530 corresponding to the certain guard interval period is maximized for Mode 3, as well as for Mode 2.

FIGS. 12A-12D show results of the power calculations performed on input signals having been transmitted in Mode 3 with guard interval periods 1/32, 1/16, 1/8, and 1/4, respectively, and output from the power calculation lower-unit 530.

When a signal transmitted in Mode 3 with a certain guard interval period is received, part of the output from the power calculation lower-unit 530 corresponding to the certain guard interval period is maximized for Mode 3 only.

As apparent from the above description, the outputs of the power calculation lower-unit 530 show characteristics that are unique to the transmission modes, respectively.

The weight assigning process as shown in FIG. 9 is performed to facilitate the detection of the transmission mode from the outputs of the power calculation lower-unit 530.

In the weight assignment calculation for Mode 1, the adders 710-713, which respectively correspond to guard interval periods 1/32, 1/16, 1/8, and 1/4, add up respective values of signals transmitted in Mode 1, 2, and 3, and then the multipliers 7200-7203 multiply the outputs of the adders by the predetermined value α0, respectively.

For example, the adder 710 adds up the power calculation results corresponding to guard interval period 1/32 of Mode 1, 2, and 3, and then the multiplier 7200 multiplies the output of the adder 710 by the predetermined value α0.

In the weight assignment calculation for Mode 2, the adders 714-717, which respectively correspond to guard interval periods 1/32, 1/16, 1/8, and 1/4, add up respective values of signals transmitted in Mode 2 and 3, and then the multipliers 7204-7207 multiply the outputs of the adders by the predetermined value α1, respectively.

In the weight assignment calculation for Mode 3, the multipliers 7208-7211 multiply the power calculation results corresponding to guard interval periods $1/32$, $1/16$, $1/8$, and $1/4$ by the predetermined value $\alpha 2$, respectively.

FIGS. 13A-13D, FIGS. 14A-14D, and FIGS. 15A-15D show results of the weight assignment calculation process described above.

As shown in FIGS. 13A-13D, FIGS. 14A-14D, and FIGS. 15A-15D, the largest value in the signal output as a result of the weight assignment calculation process corresponds to the guard interval period of the transmission mode in which the received signal was transmitted.

Figure 13A:
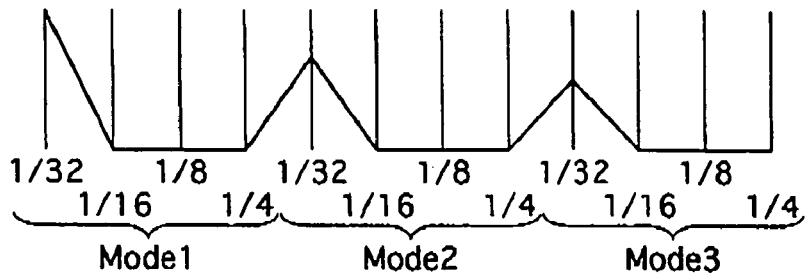
FIGS. 13A-13D show results of the weight assignment calculation process performed on input signals having been transmitted in Mode 1.
Figure 13B:
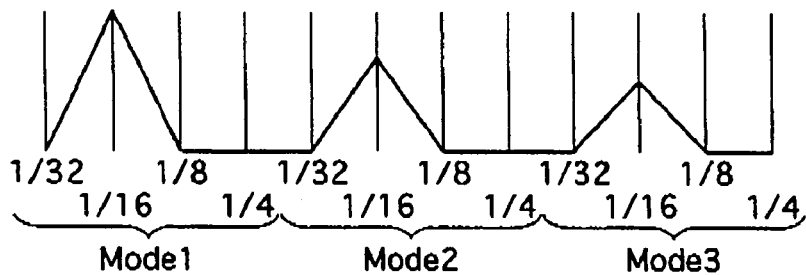
Figure 13C:
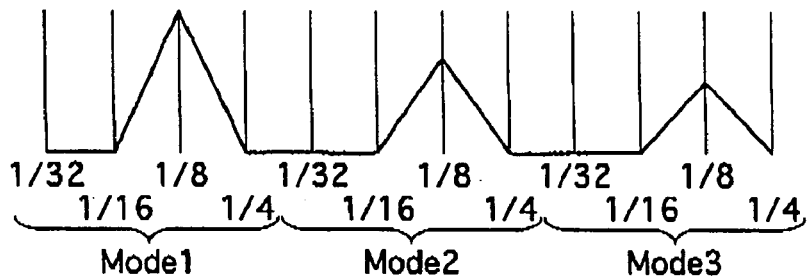
Figure 13D:
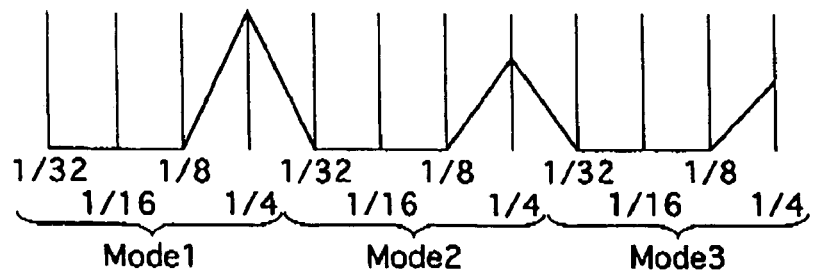
Figure 14A:
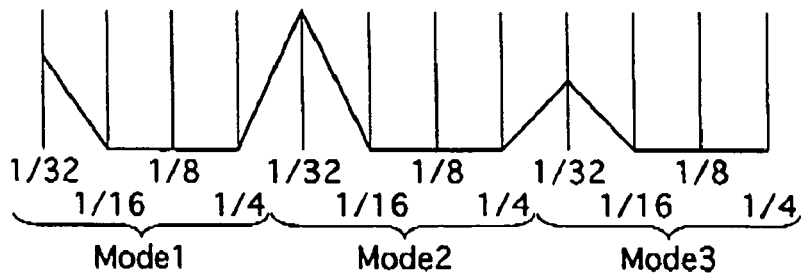
FIGS. 14A-14D show results of the weight assignment calculation process performed on input signals having been transmitted in Mode 2.
Figure 14B:
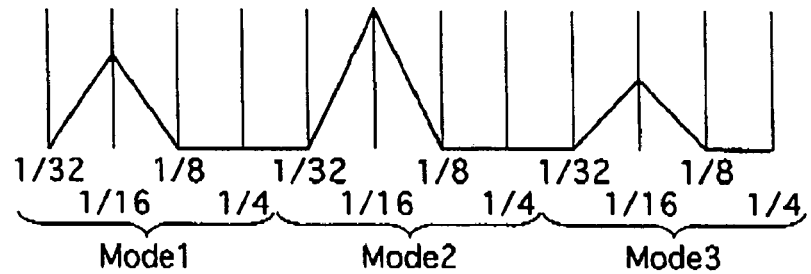
Figure 14C:
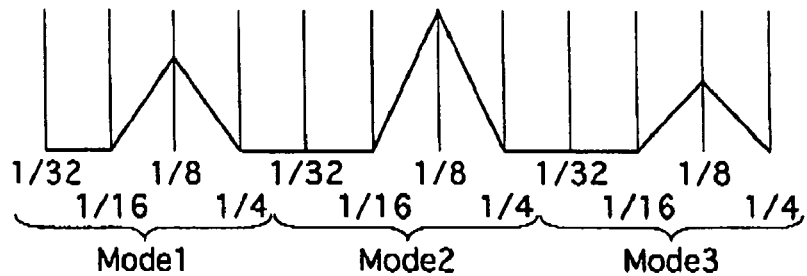
Figure 14D:
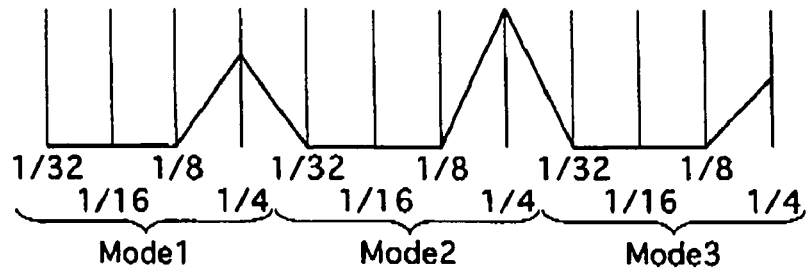
Figure 15A:
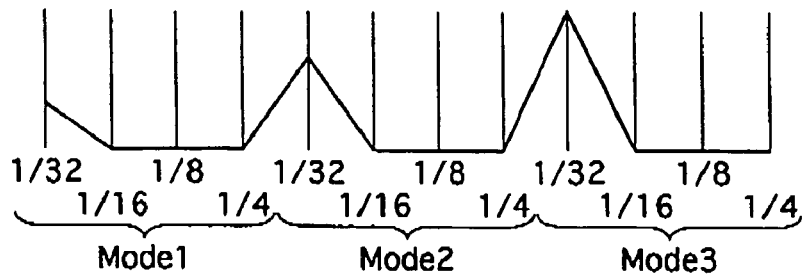
FIGS. 15A-15D show results of the weight assignment calculation process performed on input signals haying been transmitted in Mode 3.
Figure 15B:
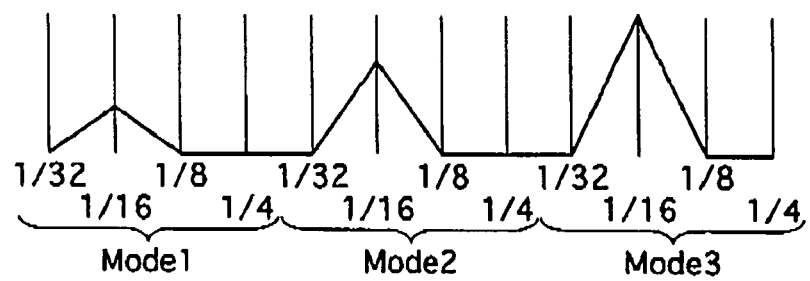
Figure 15C:
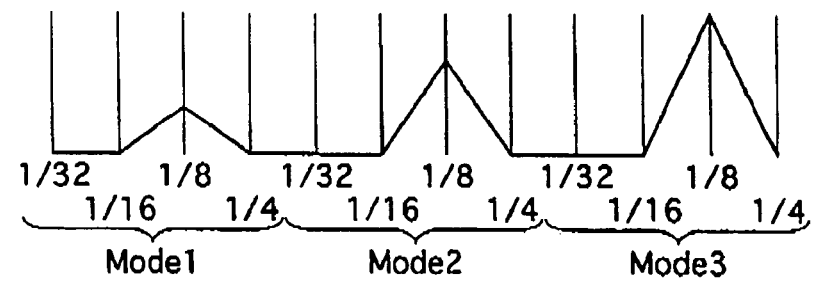
Figure 15D:
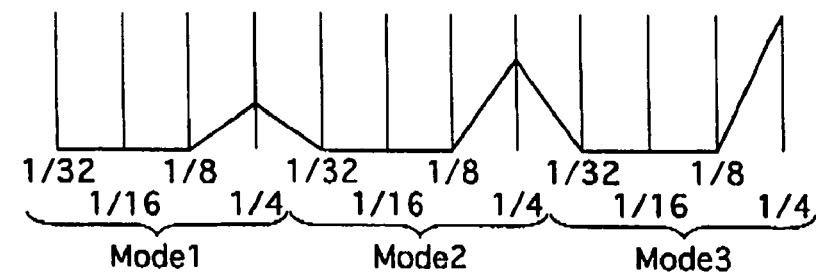

For example, if a signal transmitted in Mode 1 with guard interval period $1/32$ is received, the largest value in the signal output as a result of the weight assignment calculation process corresponds to Mode 1 with guard interval period $1/32$ (see FIG. 13A).

The maximum value detecting lower-unit 550 detects the largest value in the signal output as a result of the weight assignment calculation process, detects, as the transmission mode of the received signal, a transmission mode (with a guard interval period) that corresponds to the detected largest value, and outputs the detected transmission mode.

As described above, the cycle detection sub-unit 160 of Embodiment 2 can, relatively with ease and accuracy, detect the cycle of the correlation output, and detects the transmission mode.

<4. Comparison between Conventional and Present Invention Transmission Mode Detection Units>

The conventional transmission mode detection method based on the above-mentioned characteristics of the OFDM signal requires, for each available transmission mode, an effective symbol delay unit, a correlation calculation unit (a combination of the effective symbol delay unit and the correlation calculation unit is referred to as a delay/correlation calculation unit), an integration unit, a spectrum emphasis unit and detects, as the transmission mode of the received signal, a transmission mode corresponding to a final output that shows the strongest correlation with the received signal.

In contrast, the transmission mode detection method of the present invention requires, to deal with all available transmission modes, a delay processing unit, an addition unit, a correlation calculation unit, and an integration unit, and it detects the cycle without using a spectrum emphasis unit.

As apparent from this, the present invention achieves a great amount of reduction in circuit size, compared with the conventional technology.

Also, the present invention can deal with all available transmission modes all at once. This is a more efficient method than a serial-type conventional method that detects the transmission mode of a received signal by changing the target transmission mode one by one.

<Modification 1>

Figure 16:
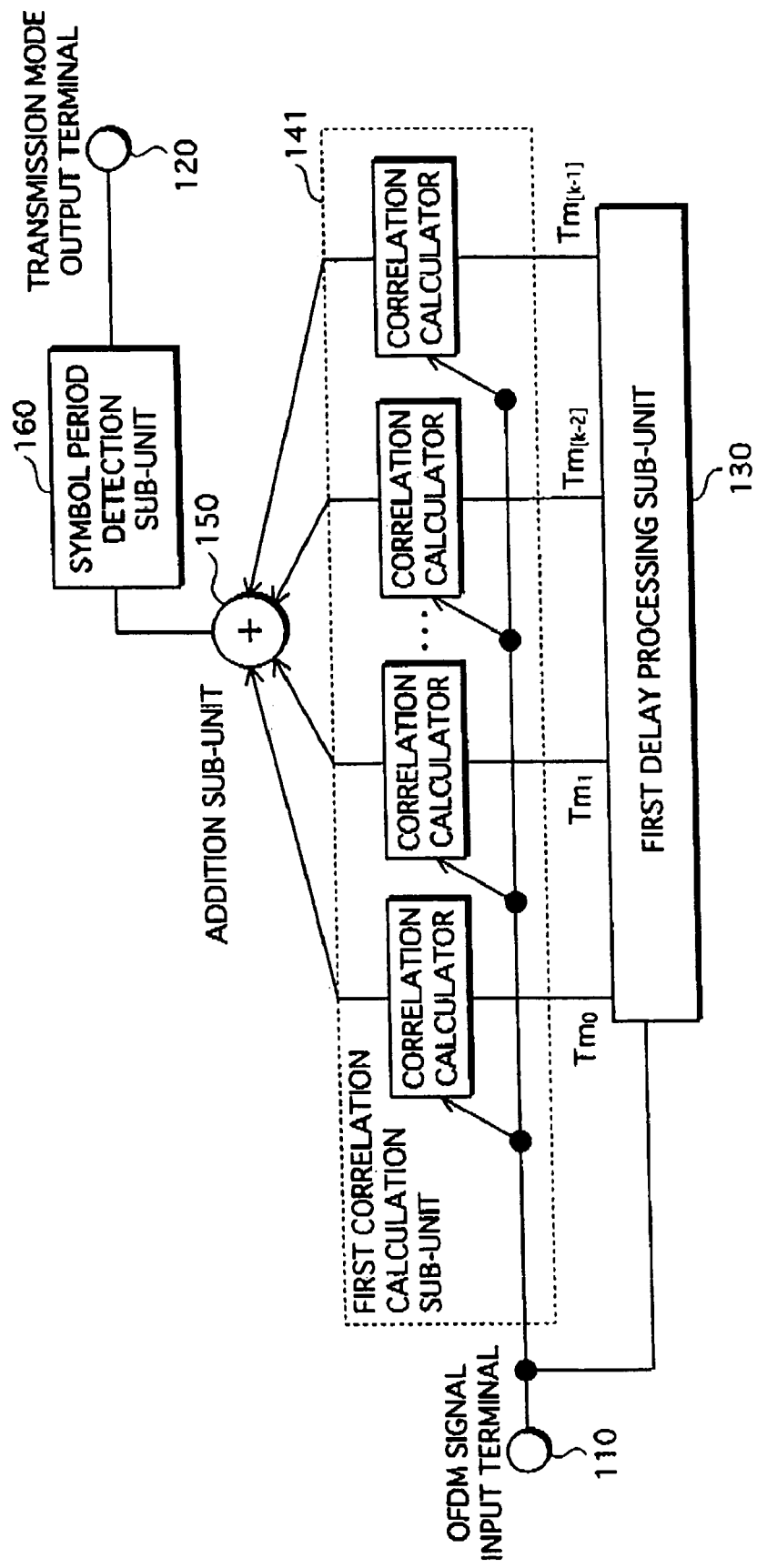
FIG. 16 shows the construction of a modification of the transmission mode detection unit 330.

FIG. 16 shows the construction of a modification of the transmission mode detection unit 330 (see FIG. 4).

A difference between the constructions of FIG. 16 and FIG. 4 is that the first delay processing sub-unit 130 and the first correlation calculation sub-unit 140 have traded places.

The same effect can be obtained with the construction shown in FIG. 16 in which a first correlation calculation sub-unit 141 calculates respective correlations between the input signal and the outputs from the first delay processing sub-unit 130, and the addition sub-unit 150 adds up all the outputs from the first correlation calculation sub-unit 141.

Figure 19:
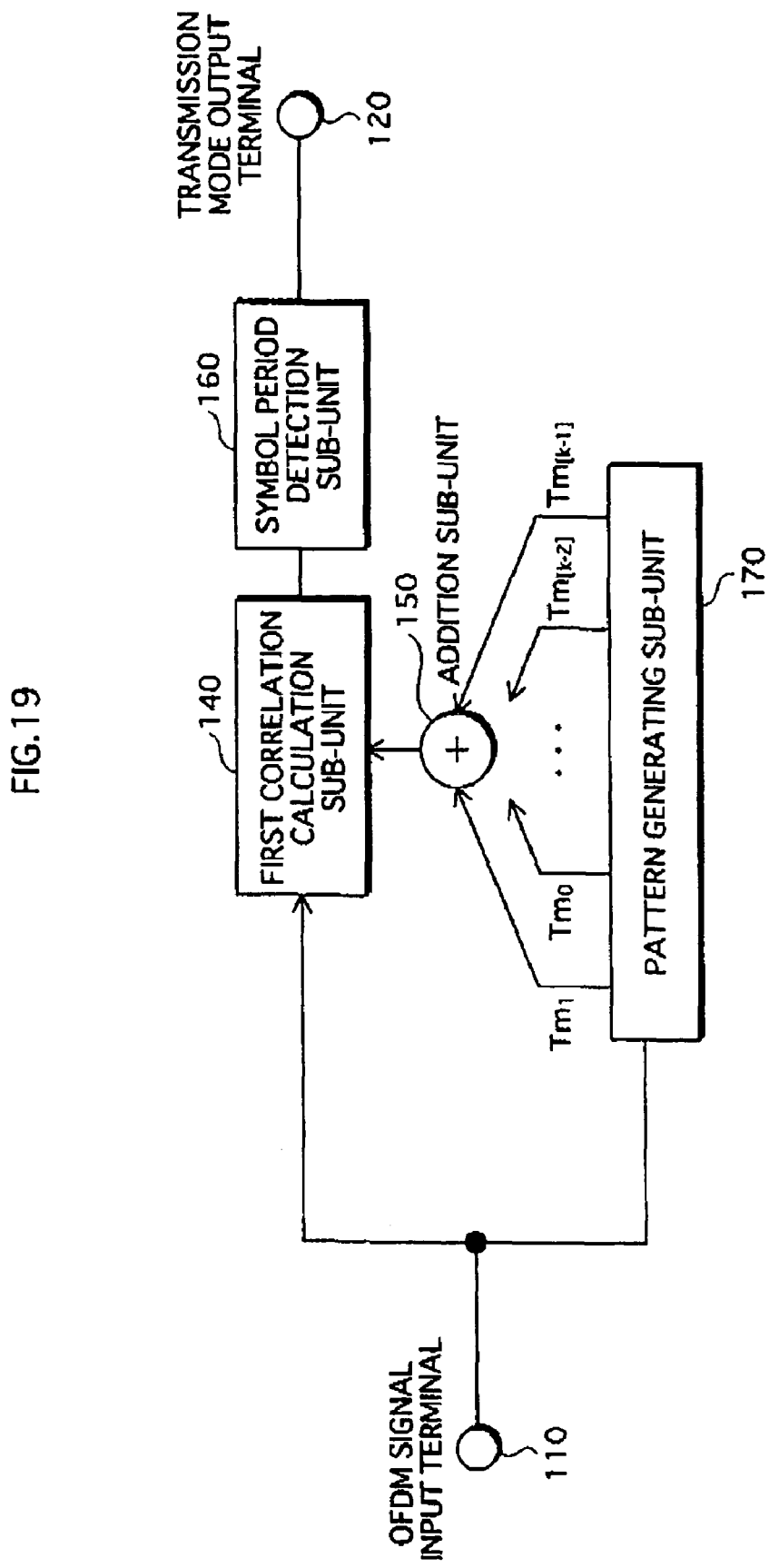
FIG. 19 is a block diagram showing the construction of a modification of the transmission mode detection unit.
Figure 20:
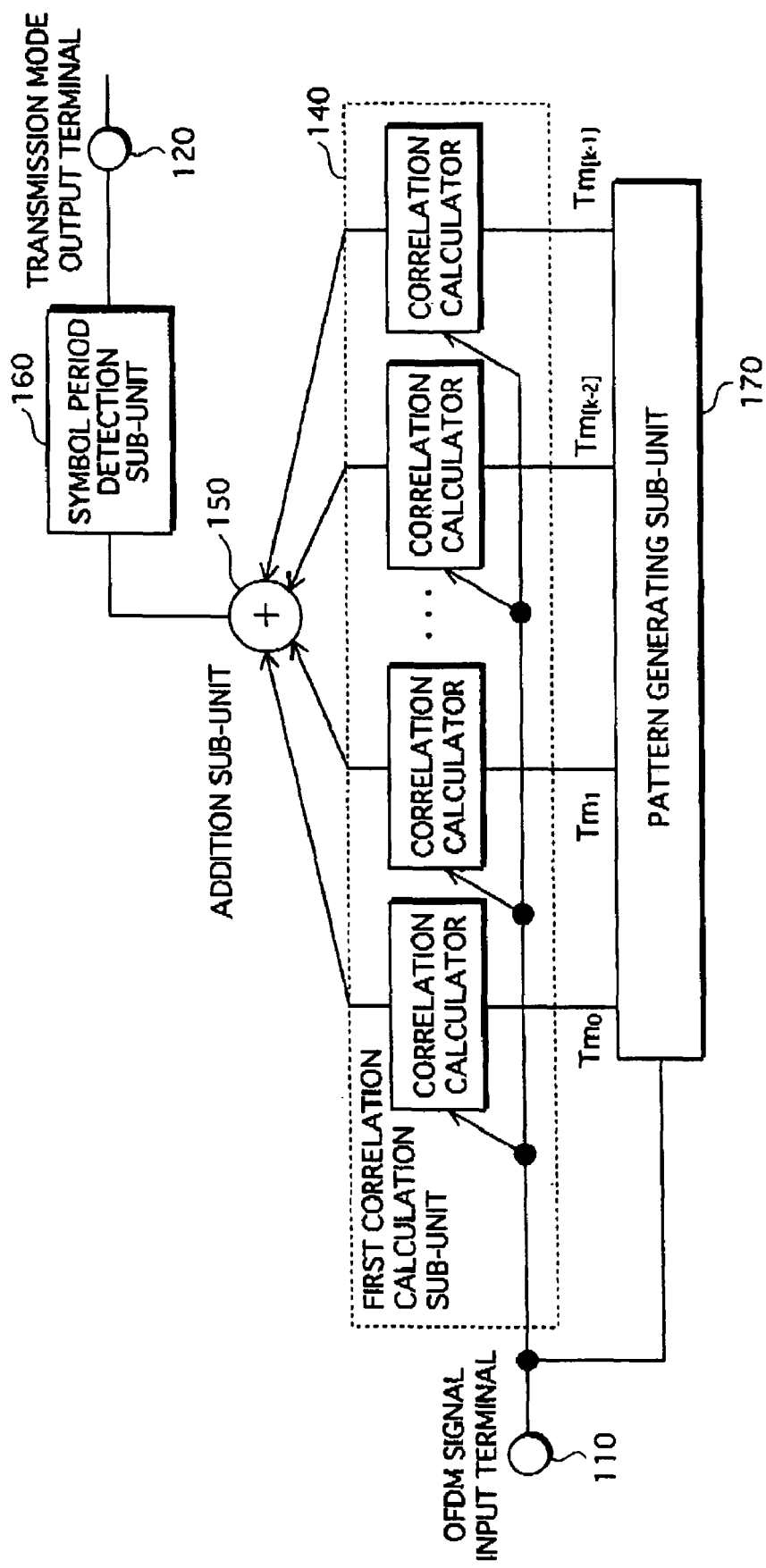
FIG. 20 is a block diagram showing the construction of a modification of the transmission mode detection unit.

Also, even in the case where the guard interval does not have a copy of part of the effective symbol, but is a signal having a known pattern, the same effect can be obtained with the constructions shown in FIGS. 19 and 20 in which the first delay processing sub-unit 130 is replaced with a pattern generating sub-unit 170 that generates the known pattern.

<Modification 2>

Figure 17:
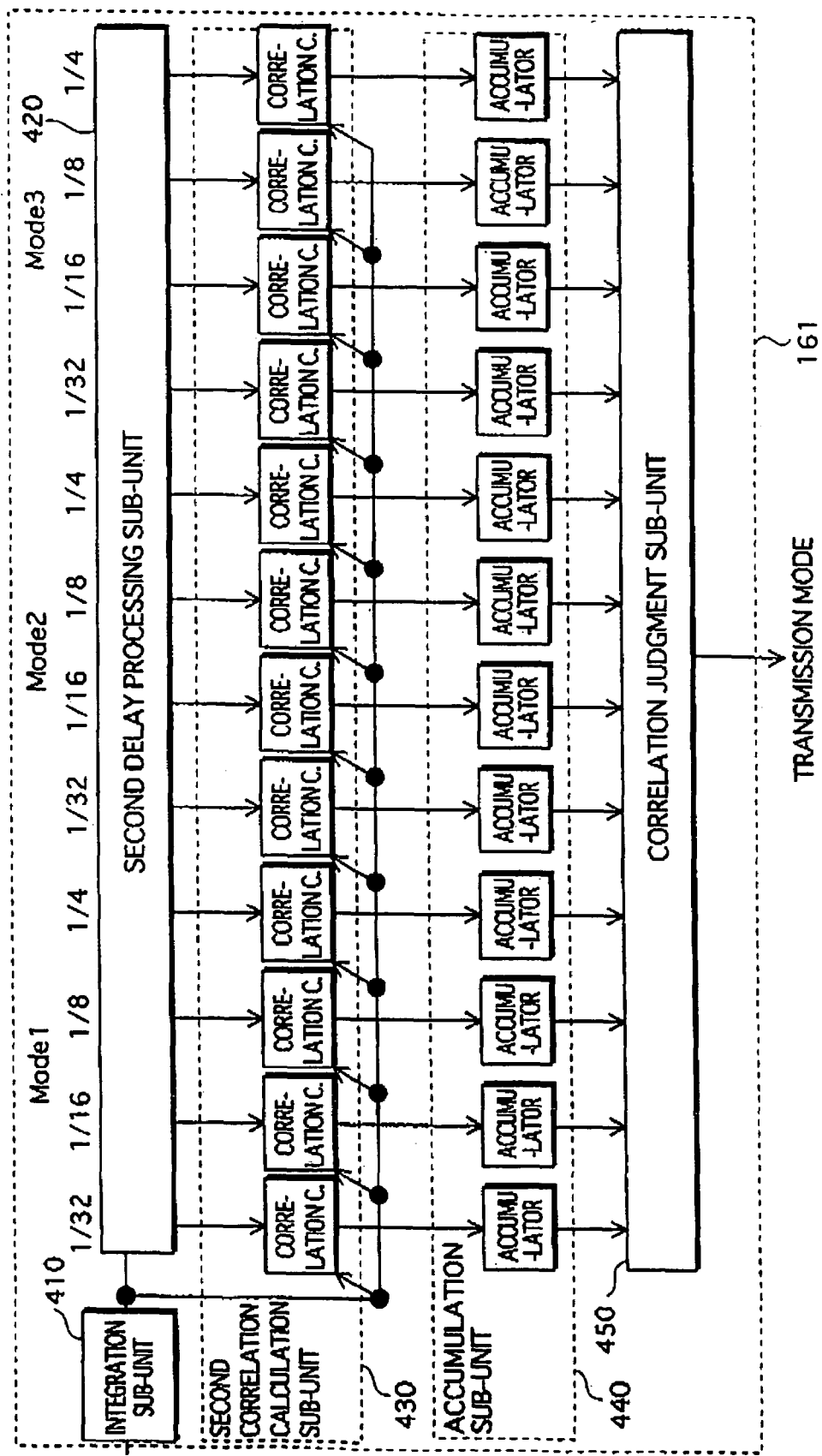
FIG. 17 is a block diagram showing the construction of a modification of the cycle detection sub-unit 160.

FIG. 17 is a block diagram showing the construction of a cycle detection sub-unit 161 that is a modification of the cycle detection sub-unit 160 (see FIG. 6).

It is presumed here that the first delay processing sub-unit 130, the first correlation calculation sub-unit 140 and the addition sub-unit 150 shown in FIG. 1 are also used in Modification 2.

A difference between the constructions of FIG. 17 and FIG. 6 is that the second correlation calculation sub-unit 610 has one correlation calculator, while a second correlation calculation sub-unit 430 of this modification has as many correlation calculators as there are available transmission modes.

The second correlation calculation sub-unit 430 of the cycle detection sub-unit 161 has K×L correlation calculators that calculate correlations between the output from the integration sub-unit 410 and the outputs from the second delay processing sub-unit 420, respectively.

With this construction, although the circuit size becomes slightly larger, the frequency with which the accumulation sub-unit 440 receives inputs increases, compared with the construction of the embodiment shown in FIG. 6. Accordingly, even if the predetermined time period for which the accumulation sub-unit 440 performs each multiplication is shortened, the same effect can be obtained with the construction of this modification as the construction of the embodiment shown in FIG. 6.

<Modification 3>

Figure 18:
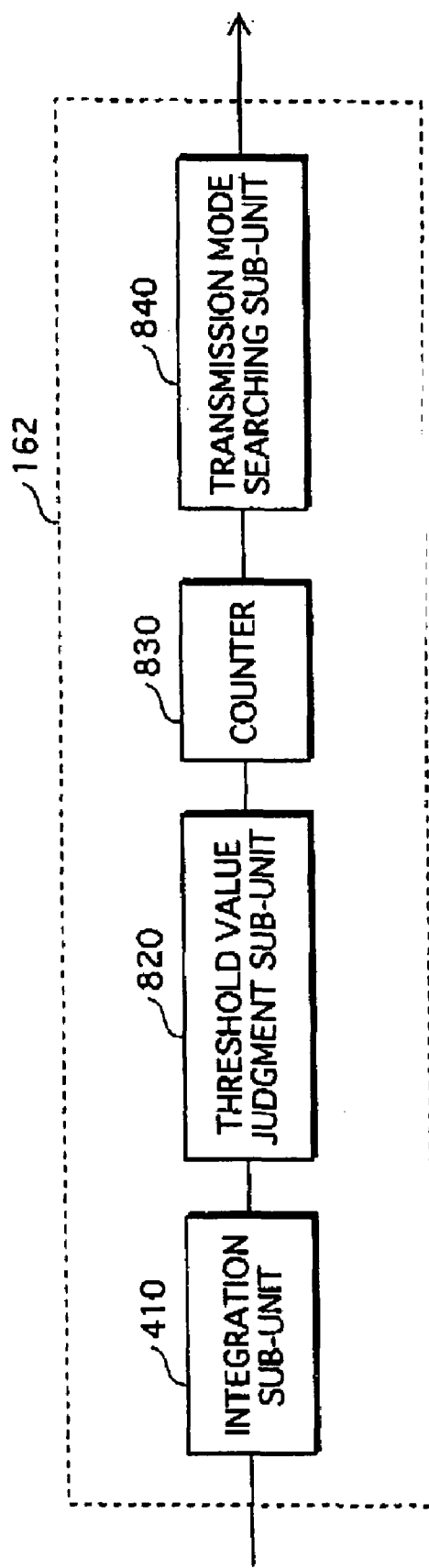
FIG. 18 is a block diagram showing the construction of a modification of the cycle detection sub-unit 160.

FIG. 18 is a block diagram showing the construction of a cycle detection sub-unit 162 that is a modification of the cycle detection sub-unit 160 (see FIG. 6).

As shown in FIG. 18, the cycle detection sub-unit 162 includes the integration sub-unit 410, a threshold value detection sub-unit 820, a counter 830, and a transmission searching sub-unit 840.

As shown in FIG. 7B, the signal output from the integration sub-unit 410 shows a correlation with the input signal in cycles of transmission symbol period of the transmission mode.

To make use of this characteristic, the threshold value detection sub-unit 820 is provided to detect whether the value of the signal exceeds a predetermined threshold value, and the counter 830 is reset depending of the output from the threshold value detection sub-unit 820.

With such an operation, the largest values taken by the counter 830 correspond to transmission symbol periods.

It is accordingly possible to detect the transmission mode of the received signal from the largest value of an output from the counter 830.

For example, assume that the counter is reset each time the signal exceeds the threshold value, and that the counter counts a number every one sample, then the largest value taken by the counter for a signal corresponds to any of available transmission symbol periods.

More specifically, when the largest value of the counter is "2112", the transmission mode is detected as Mode 1 with guard interval period $1/32$. This is because when the transmission mode is Mode 1 with guard interval period $1/32$, one transmission symbol period is (Tm0+Tm0g0=2048+64=) 2112 (see FIG. 21).

Similarly, when the largest value of the counter is "10240", the transmission mode is detected as Mode 3 with guard interval period ¼. This is because when the transmission mode is Mode 3 with guard interval period ¼, one transmission symbol period is (Tm2+Tm2g2=8192+2048=) 10240.

As described above, the cycle detection sub-unit 162 of this modification achieves an automatic detection of the transmission mode without requiring a delay/correlation calculation unit, an integration unit, and a symbol filter for each available transmission mode. This makes it possible to achieve a reduced circuit size, compared with the conventional circuit structure.

<Supplementary Notes>

Up to now, the demodulation apparatus of the present invention has been described based on an embodiment thereof. However, not limited to the embodiment, the present invention may be modified in many ways including the following.

(1) In the above-described embodiment and modifications, a case where K=3 and L=4 is used to explain the ISDB-T method, for convenience's sake. However, the present invention may be applied to other combinations of (K,L), with the same construction.

(2) Typically, the functional blocks: A/D conversion unit 310, quadrature demodulation unit 320, transmission mode detection unit 330, OFDM demodulation unit 340, and error correction unit 350 of the OFDM demodulation apparatus are achieved as an LSI (Large-Scale Integration). Each of the functional blocks may be achieved in a separate chip, or part or all of the functional blocks may be achieved in a chip.

It should be noted here that although the term LSI (Large Scale Integrated circuit) is used here, it may be called IC, system LSI, super LSI, ultra LSI or the like, depending on the level of integration.

Also, the integrated circuit is not limited to the LSI, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An Orthogonal Frequency Division Multiplexing ("OFDM") demodulation apparatus for receiving an OFDM signal having an effective symbol period among a plurality of effective symbol periods, and demodulating the received OFDM signal, comprising:

a transmission mode determining unit determining the effective symbol period of the received OFDM signal, wherein the transmission mode determining unit includes:

a plurality of correlators that respectively correspond to the plurality of effective symbol periods, each of the plurality of correlators delaying the received OFDM signal by a corresponding effective symbol period, and outputting a correlation signal that indicates correlation between the delayed OFDM signal and the received OFDM signal;

a combiner generating a first correlation signal by combining a plurality of correlation signals output from the plurality of correlators, and outputting the generated first correlation signal; and means for determining the effective symbol period of the received OFDM signal in accordance with the first correlation signal, wherein the OFDM signal further has a guard interval period among a plurality of guard interval periods, and the means for determining the effective symbol period of the received OFDM signal in accordance with the first correlation signal includes:

an integrator generating an integration signal by accumulating periods, each of which is a shortest period among the plurality of effective symbol periods and the plurality of guard interval periods, in a predetermined period of the first correlation signal;

a delayer generating as many delayed signals as a number of combinations of the plurality of effective symbol periods and the plurality of effective symbol periods, each of the delayed signals being generated by delaying the generated integration signal by a different combination of one of the plurality of effective symbol periods and one of the plurality of guard interval periods;

a correlator outputting a plurality of second correlation signals each of which is a correlation signal indicating a correlation between a different one of the delayed signals and the integration signal; and means for determining the effective symbol period and the guard interval period of the received OFDM signal in accordance with a second correlation signal that indicates a largest correlation level among the plurality of second correlation signals.

2. The OFDM demodulation apparatus of claim 1, wherein the means for determining the effective symbol period and the guard interval period of the received OFDM signal in accordance with a second correlation signal that indicates a largest correlation level among the plurality of second correlation signals includes:

a power calculator calculating values of power of the plurality of second correlation signals; and a weight assigner assigning a predetermined weight to each of the calculated values of power, wherein the means for determining the effective symbol period and the guard interval period of the received OFDM signal in accordance with a second correlation signal that indicates a largest correlation level among the plurality of second correlation signals, regards a second correlation signal having a largest value of power after the assignment of weights by the weight assigner as the second correlation signal that indicates the largest correlation level.

3. The OFDM demodulation apparatus of claim 2, wherein in the weight assigner, when "K" represents the number of the plurality of effective symbol periods and "L" represents the number of the plurality of guard interval periods, and when the calculated values of power of the K×L second correlation signals are represented as $In_{00}$, $In_{10}$, ... $In_{(K-1)(L-1)}$, values of power after the assignment of weights by the weight assigner are represented as $Out_{00}$, $Out_{01}$, ... $Out_{(K-1)(L-1)}$, and a given constant is represented as $\alpha_i$, the values of power after the assignment of weights by the weight assigner are defined by Equation 1

$$Out_{ij} = \alpha_i \sum_{n=i}^{i-1} In_{nj}.$$

4. The OFDM demodulation apparatus of claim 2 wherein the means for determining the effective symbol period and the guard interval period of the received OFDM signal in accordance with a second correlation signal that indicates a largest correlation level among the plurality of second correlation signals further includes:

a maximum value detecting lower-unit connected to the weight assigner, the maximum value detecting lower-unit determining the effective symbol period and the guard interval of the received OFDM signal by determining that a second correlation signal having a largest value of power after the assignment of weights by the weight assigner is the second correlation signal that indicates the largest correlation level.

5. The OFDM demodulation apparatus of claim 1 wherein the OFDM signal is comprised only of the effective symbol period and the guard interval period.

6. The OFDM demodulation apparatus of claim 5 wherein the guard interval period is a copy of a portion of the effective symbol period in the OFDM signal.

7. An Orthogonal Frequency Division Multiplexing ("OFDM") demodulation apparatus for receiving an OFDM signal having an effective symbol period among a plurality of effective symbol periods, and demodulating the received OFDM signal, comprising:

a transmission mode determining unit determining the effective symbol period of the received OFDM signal, wherein the transmission mode determining unit includes:

a plurality of correlators that respectively correspond to the plurality of effective symbol periods, each of the plurality of correlators delaying the received OFDM signal by a corresponding effective symbol period, and outputting a correlation signal that indicates correlation between the delayed OFDM signal and the received OFDM signal;

a combiner generating a first correlation signal by combining a plurality of correlation signals output from the plurality of correlators, and outputting the generated first correlation signal; and means for determining the effective symbol period of the received OFDM signal in accordance with the first correlation signal, wherein the OFDM signal further has a guard interval period among a plurality of guard interval periods, and the means for determining the effective symbol period of the received OFDM signal in accordance with the first correlation signal includes:

an integrator generating an integration signal by accumulating periods, each of which is a shortest period among the plurality of effective symbol periods and the plurality of guard interval periods, in a predetermined period of the first correlation signal;

a measurer measuring a duration between a time when the integration signal exceeds a predetermined threshold value a first time and a time when the integration signal exceeds the predetermined threshold value a second time; and means for determining the effective symbol period and the guard interval period of the received OFDM signal in accordance with the measured duration.

8. An Orthogonal Frequency Division Multiplexing ("OFDM") demodulation apparatus for receiving an OFDM signal having an effective symbol period among a plurality of effective symbol periods, and demodulating the received OFDM signal, comprising:

a transmission mode determining unit determining the effective symbol period of the received OFDM signal, wherein the transmission mode determining unit includes:

a combiner generating a combination signal by combining a plurality of delayed signals each of which is generated by delaying the received OFDM signal by a different one of the plurality of effective symbol periods, and outputting the generated combination signal;

a correlator outputting a first correlation signal which is a correlation signal indicating a correlation between the combination signal and the received OFDM signal; and means for determining the effective symbol period of the received OFDM signal in accordance with the first correlation signal, wherein the OFDM signal further has a guard interval period among a plurality of guard interval periods, and the means for determining the effective symbol period of the received OFDM signal in accordance with the first correlation signal includes:

an integrator generating an integration signal by accumulating periods, each of which is a shortest period among the plurality of effective symbol periods and the plurality of guard interval periods, in a predetermined period of the first correlation signal;

a delayer generating as many delayed signals as a number of combinations of the plurality of effective symbol periods and the plurality of effective symbol periods, each of the delayed signals being generated by delaying the generated integration signal by a different combination of one of the plurality of effective symbol periods and one of the plurality of guard interval periods;

a correlator outputting a plurality of second correlation signals each of which is a correlation signal indicating a correlation between a different one of the delayed signals and the integration signal; and means for determining the effective symbol period and the guard interval period of the received OFDM signal in accordance with a second correlation signal that indicates a largest correlation level among the plurality of second correlation signals.

9. The OFDM demodulation apparatus of claim 8, wherein the means for determining the effective symbol period and the guard interval period of the received OFDM signal in accordance with a second correlation signal that indicates a largest correlation level among the plurality of second correlation signals includes:

a power calculator calculating values of power of the plurality of second correlation signals; and a weight assigner assigning a predetermined weight to each of the calculated values of power, and the means for determining the effective symbol period and the guard interval period of the received OFDM signal in accordance with a second correlation signal that indicates a largest correlation level among the plurality of second correlation signals regards a second correlation signal having a largest value of power after the assignment of weights by the weight assigner as the second correlation signal that indicates the largest correlation level.

10. The OFDM demodulation apparatus of claim 9, wherein
in the weight assigner, when "K" represents the number of the plurality of effective symbol periods and "L" represents the number of the plurality of guard interval periods, and when the calculated values of power of the K×L second correlation signals are represented as $In_{00}$, $In_{10}, \ldots In_{(K-1)(L-1)}$, values of power after the assignment of weights by the weight assigner are represented as $Out_{00}, Out_{01}, \ldots Out_{(K-1)(L-1)}$, and a given constant is represented as $\alpha_i$, the values of power after the assignment of weights by the weight assigner are defined by Equation 1:

$$Out_{ij} = \alpha_i \sum_{n=i}^{i-1} In_{nj}.$$

11. An Orthogonal Frequency Division Multiplexing ("OFDM") demodulation apparatus for receiving an OFDM signal having an effective symbol period among a plurality of effective symbol periods, and demodulating the received OFDM signal, comprising:
a transmission mode determining unit determining the effective symbol period of the received OFDM signal, wherein
the transmission mode determining unit includes:
a combiner generating a combination signal by combining a plurality of delayed signals each of which is generated by delaying the received OFDM signal by a different one of the plurality of effective symbol periods, and outputting the generated combination signal;
a correlator outputting a first correlation signal which is a correlation signal indicating a correlation between the combination signal and the received OFDM signal; and
means for determining the effective symbol period of the received OFDM signal in accordance with the first correlation signal, wherein the OFDM signal further has a guard interval period among a plurality of guard interval periods, and
the means for determining the effective symbol period of the received OFDM signal in accordance with the first correlation signal includes:
an integrator generating an integration signal by accumulating periods, each of which is a shortest period among the plurality of effective symbol periods and the plurality of guard interval periods, in a predetermined period of the first correlation signal;
a measurer measuring a duration between a time when the integration signal exceeds a predetermined threshold value a first time and a time when the integration signal exceeds the predetermined threshold value a second time; and
means for determining the effective symbol period and the guard interval period of the received OFDM signal in accordance with the measured duration.

12. An Orthogonal Frequency Division Multiplexing ("OFDM") demodulation method for receiving an OFDM signal having an effective symbol period among a plurality of effective symbol periods, and demodulating the received OFDM signal, comprising:
a transmission mode determining step for determining the effective symbol period of the received OFDM signal, wherein
the transmission mode determining step includes:
a plurality of correlation sub-steps that respectively correspond to the plurality of effective symbol periods, each of the plurality of correlation sub-steps delaying the received OFDM signal by a corresponding effective symbol period, and outputting a correlation signal that indicates correlation between the delayed OFDM signal and the received OFDM signal;
a combining sub-step for generating a first correlation signal by combining a plurality of correlation signals output from the plurality of correlators, and outputting the generated first correlation signal; and
a determining sub-step for determining the effective symbol period of the received OFDM signal in accordance with the first correlation signal includes an integrator sub-step for generating an integration signal by accumulating periods, each of which is a shortest period among the plurality of effective symbol periods and the plurality of guard interval periods, in a predetermined period of the first correlation signal;
a delayer sub-step for generating as many delayed signals as a number of combinations of the plurality of effective symbol periods and the plurality of effective symbol periods, each of the delayed signals being generated by delaying the generated integration signal by a different combination of one of the plurality of effective symbol periods and one of the plurality of guard interval periods;
a correlators sub-step for outputting a plurality of second correlation signals each of which is a correlation signal indicating a correlation between a different one of the delayed signals and the integration signal; and
a period sub-step for determining the effective symbol period and the guard interval period of the received OFDM signal in accordance with a second correlation signal that indicates a largest correlation level among the plurality of second correlation signals.

13. A Large Scale Integrated circuit ("LSI") for receiving an Orthogonal Frequency Division Multiplexing ("OFDM") signal having an effective symbol period among a plurality of effective symbol periods, and demodulating the received OFDM signal, comprising:
a transmission mode determining unit determining the effective symbol period of the received OFDM signal, wherein
the transmission mode determining unit includes:
a plurality of correlators that respectively correspond to the plurality of effective symbol periods, each of the plurality of correlators delaying the received OFDM signal by a corresponding effective symbol period, and outputting a correlation signal that indicates correlation between the delayed OFDM signal and the received OFDM signal;
a combiner generating a first correlation signal by combining a plurality of correlation signals output from the plurality of correlators, and output the generated first correlation signal; and
means for determining the effective symbol period of the received OFDM signal in accordance with the first correlation signal, wherein the OFDM signal further has a guard interval period among a plurality of guard interval periods, and
the means for determining the effective symbol period of the received OFDM signal in accordance with the first correlation signal includes:

an integrator generating an integration signal by accumulating periods, each of which is a shortest period among the plurality of effective symbol periods and the plurality of guard interval periods, in a predetermined period of the first correlation signal;

a delayer generating as many delayed signals as a number of combination of the plurality of effective symbol periods and the plurality of effective symbol periods, each of the delayed signals being generated by delaying the generated integration signal by a different combination of one of the plurality of effective symbol periods and one of the plurality of guard interval periods;

a correlator outputting a plurality of second correlation signals each of which is a correlation signal indicating a correlation between a different one of the delayed signals and the integration signal; and means for determining the effective symbol period and the guard interval period of the received OFDM signal in accordance with a second correlation signal that indicates a largest correlation level among the plurality of second correlation signals.

14. An Orthogonal Frequency Division Multiplexing ("OFDM") demodulation method for receiving an OFDM signal having an effective symbol period among a plurality of effective symbol periods, and demodulating the received OFDM signal, comprising:

a transmission mode determining step for determining the effective symbol period of the received OFDM signal, wherein the transmission mode determining step includes:

a combining sub-step for generating a combination signal by combining a plurality of delayed signals each of which is generated by delaying the received OFDM signal by a different one of the plurality of effective symbol periods, and outputting the generated combination signal;

a correlation sub-step for outputting a first correlation signal which is a correlation signal indicating a correlation between the combination signal and the received OFDM signal; and a determining sub-step for determining the effective symbol period of the received OFDM signal in accordance with the first correlation signal, wherein the OFDM signal further has a guard interval period among a plurality of guard interval periods, and the determining sub-step further includes, an integrator sub-step for generating an integration signal by accumulating periods, each of which is a shortest period among the plurality of effective symbol periods and the plurality of guard interval periods, in a predetermined period of the first correlation signal;

a delayer sub-step generating as many delayed signals as a number of combination of the plurality of effective symbol periods and the plurality of effective symbol periods, each of the delayed signals being generated by delaying the generated integration signal by a different combination of one of the plurality of effective symbol periods and one of the plurality of guard interval periods;

a correlator sub-step for outputting a plurality of second correlation signals each of which is a correlation signal indicating a correlation between a different one of the delayed signals and the integration signal; and a period sub-step for determining the effective symbol period and the guard interval period of the received OFDM signal in accordance with a second correlation signal that indicates a largest correlation level among the plurality of second correlation signals.

15. A Large Scale Integrated circuit ("LSI") for receiving an Orthogonal Frequency Division Multiplexing ("OFDM") signal having an effective symbol period among a plurality of effective symbol periods, and demodulating the received OFDM signal, comprising:

a transmission mode determining unit determining the effective symbol period of the received OFDM signal, wherein the transmission mode determining unit includes:

a combiner generating a combination signal by combining a plurality of delayed signals each of which is generated by delaying the received OFDM signal by a different one of the plurality of effective symbol periods, and output the generated combination signal;

a correlator outputting a first correlation signal which is a correlation signal indicating a correlation between the combination signal and the received OFDM signal; and means for determining the effective symbol period of the received OFDM signal in accordance with the first correlation signal, wherein the OFDM signal further has a guard interval period among a plurality of guard interval periods, and the means for determining the effective symbol period of the received OFDM signal in accordance with the first correlation signal includes:

an integrator for generating an integration signal by accumulating periods, each of which is a shortest period among the plurality of effective symbol periods and the plurality of guard interval periods, in a predetermined period of the first correlation signal;

a delayer generating as many delayed signals as a number of combination of the plurality of effective symbol periods and the plurality of effective symbol periods, each of the delayed signals being generated by delaying the generated integration signal by a different combination of one of the plurality of effective symbol periods and one of the plurality of guard interval periods;

a correlator outputting a plurality of second correlation signals each of which is a correlation signal indicating a correlation between a different one of the delayed signals and the integration signal; and means for determining the effective symbol period and the guard interval period of the received OFDM signal in accordance with a second correlation signal that indicates a largest correlation level among the plurality of second correlation signals.

* * * * *